United States Patent
Wagner

(10) Patent No.: US 10,353,678 B1
(45) Date of Patent: Jul. 16, 2019

(54) DETECTING CODE CHARACTERISTIC ALTERATIONS DUE TO CROSS-SERVICE CALLS

(71) Applicant: Amazon Technologies, Inc., Seattle, WA (US)

(72) Inventor: Timothy Allen Wagner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/888,914

(22) Filed: Feb. 5, 2018

(51) Int. Cl.
- G06F 11/36 (2006.01)
- H04M 3/51 (2006.01)
- G06F 9/44 (2018.01)
- G06F 8/41 (2018.01)
- G06F 9/54 (2006.01)

(52) U.S. Cl.
CPC .............. G06F 8/433 (2013.01); G06F 9/548 (2013.01)

(58) Field of Classification Search
CPC .......... G06F 9/547; G06F 9/548; G06F 8/433; G06F 11/0709; G06F 9/3495; G06F 9/3636; G06F 9/3688; H04L 63/20; H04L 41/12; H04L 41/22; H04L 41/046
See application file for complete search history.

(56) References Cited

U.S. PATENT DOCUMENTS

| | | | |
|---|---|---|---|
| 4,949,254 A | 8/1990 | Shorter | |
| 5,283,888 A | 2/1994 | Dao et al. | |
| 5,970,488 A | 10/1999 | Crowe et al. | |
| 6,385,636 B1 | 5/2002 | Suzuki | |
| 6,463,509 B1 | 10/2002 | Teoman et al. | |
| 6,708,276 B1 | 3/2004 | Yarsa et al. | |

(Continued)

FOREIGN PATENT DOCUMENTS

| | | |
|---|---|---|
| EP | 2663052 A1 | 11/2013 |
| JP | 2002287974 A | 10/2002 |

(Continued)

OTHER PUBLICATIONS

Wu et al., HC-Midware: A Middleware to Enable High Performance Communication System Simulation in Heterogeneous Cloud, 10 pages (Year: 2017).*

(Continued)

*Primary Examiner* — Thuy Dao
(74) *Attorney, Agent, or Firm* — Knobbe, Martens, Olson & Bear, LLP

(57) ABSTRACT

Systems and methods are described for conducting static analysis of code invoking network-based services to identify, without requiring execution of the code, changes in code characteristics that may be caused due to the invocations of the network-based services. A system is provided that may analyze code to detect both direct invocations of services, as well as indirect invocations caused by the direct invocations. The system can utilize information regarding directly or indirectly invoked services to determine whether the invocation of such services will change desired code characteristics, such as idempotency or conformity to a standard. In some instances, the system can traverse a "call graph" of all services invoked by code either directly or indirectly to identify characteristic changes through multiple levels of indirection.

19 Claims, 7 Drawing Sheets

(56) References Cited

U.S. PATENT DOCUMENTS

| | | |
|---|---|---|
| 7,036,121 B1 | 4/2006 | Casabona et al. |
| 7,590,806 B2 | 9/2009 | Harris et al. |
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,886,021 B2 | 2/2011 | Scheifler et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,065,682 B2 | 11/2011 | Baryshnikov et al. |
| 8,095,931 B1 | 1/2012 | Chen et al. |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,209,695 B1 | 6/2012 | Pruyne et al. |
| 8,219,987 B1 | 7/2012 | Vlaovic et al. |
| 8,321,554 B2 | 11/2012 | Dickinson |
| 8,321,558 B1 | 11/2012 | Sirota et al. |
| 8,336,079 B2 | 12/2012 | Budko et al. |
| 8,429,282 B1 | 4/2013 | Ahuja |
| 8,448,165 B1 | 5/2013 | Conover |
| 8,490,088 B2 | 7/2013 | Tang |
| 8,555,281 B1 | 10/2013 | Van Dijk et al. |
| 8,566,835 B2 | 10/2013 | Wang et al. |
| 8,613,070 B1 | 12/2013 | Borzycki et al. |
| 8,631,130 B2 | 1/2014 | Jackson |
| 8,677,359 B1 | 3/2014 | Cavage et al. |
| 8,694,996 B2 | 4/2014 | Cawlfield et al. |
| 8,719,415 B1 | 5/2014 | Sirota et al. |
| 8,725,702 B1 | 5/2014 | Raman et al. |
| 8,756,696 B1 | 6/2014 | Miller |
| 8,769,519 B2 | 7/2014 | Leitman et al. |
| 8,799,236 B1 | 8/2014 | Azari et al. |
| 8,799,879 B2 | 8/2014 | Wright et al. |
| 8,806,468 B2 | 8/2014 | Meijer et al. |
| 8,819,679 B2 | 8/2014 | Agarwal et al. |
| 8,825,863 B2 | 9/2014 | Hansson et al. |
| 8,825,964 B1 | 9/2014 | Sopka et al. |
| 8,850,432 B2 | 9/2014 | Mcgrath et al. |
| 8,874,952 B2 | 10/2014 | Tameshige et al. |
| 8,904,008 B2 | 12/2014 | Calder et al. |
| 8,997,093 B2 | 3/2015 | Dimitrov |
| 9,027,087 B2 | 5/2015 | Ishaya et al. |
| 9,038,068 B2 | 5/2015 | Engle et al. |
| 9,086,897 B2 | 7/2015 | Oh et al. |
| 9,092,837 B2 | 7/2015 | Bala et al. |
| 9,098,528 B2 | 8/2015 | Wang |
| 9,110,732 B1 | 8/2015 | Forschmiedt et al. |
| 9,110,770 B1 * | 8/2015 | Raju ......................... G06F 8/77 |
| 9,112,813 B2 | 8/2015 | Jackson |
| 9,141,410 B2 | 9/2015 | Leafe et al. |
| 9,146,764 B1 | 9/2015 | Wagner |
| 9,152,406 B2 | 10/2015 | De et al. |
| 9,164,754 B1 | 10/2015 | Pohlack |
| 9,183,019 B2 | 11/2015 | Kruglick |
| 9,208,007 B2 | 12/2015 | Harper et al. |
| 9,218,190 B2 | 12/2015 | Anand et al. |
| 9,223,561 B2 | 12/2015 | Orveillon et al. |
| 9,223,966 B1 | 12/2015 | Satish et al. |
| 9,250,893 B2 | 2/2016 | Blahaerath et al. |
| 9,268,586 B2 | 2/2016 | Voccio et al. |
| 9,298,633 B2 | 3/2016 | Zhao et al. |
| 9,317,689 B2 | 4/2016 | Aissi |
| 9,323,556 B2 | 4/2016 | Wagner |
| 9,361,145 B1 | 6/2016 | Wilson et al. |
| 9,413,626 B2 | 8/2016 | Reque et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,483,335 B1 | 11/2016 | Wagner et al. |
| 9,489,227 B2 | 11/2016 | Oh et al. |
| 9,537,788 B2 | 1/2017 | Reque et al. |
| 9,575,798 B2 | 2/2017 | Terayama et al. |
| 9,588,790 B1 | 3/2017 | Wagner et al. |
| 9,596,350 B1 * | 3/2017 | Dymshyts .............. H04M 3/523 |
| 9,600,312 B2 | 3/2017 | Wagner et al. |
| 9,652,306 B1 | 5/2017 | Wagner et al. |
| 9,652,617 B1 | 5/2017 | Evans et al. |
| 9,654,508 B2 | 5/2017 | Barton et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,703,681 B2 * | 7/2017 | Taylor ................... G06F 11/362 |
| 9,715,402 B2 | 7/2017 | Wagner et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,767,271 B2 | 9/2017 | Ghose |
| 9,785,476 B2 | 10/2017 | Wagner et al. |
| 9,787,779 B2 * | 10/2017 | Frank ...................... H04L 67/16 |
| 9,811,363 B1 | 11/2017 | Wagner |
| 9,811,434 B1 | 11/2017 | Wagner |
| 9,830,175 B1 | 11/2017 | Wagner |
| 9,830,193 B1 | 11/2017 | Wagner et al. |
| 9,830,449 B1 | 11/2017 | Wagner |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,929,916 B1 | 3/2018 | Subramanian et al. |
| 9,930,103 B2 | 3/2018 | Thompson |
| 9,952,896 B2 | 4/2018 | Wagner et al. |
| 9,971,678 B2 * | 5/2018 | Poulin ................. G06F 11/3457 |
| 9,979,817 B2 * | 5/2018 | Huang .............. H04M 3/42059 |
| 10,002,026 B1 | 6/2018 | Wagner |
| 10,013,267 B1 | 7/2018 | Wagner et al. |
| 10,042,660 B2 | 8/2018 | Wagner et al. |
| 10,048,974 B1 | 8/2018 | Wagner et al. |
| 10,061,613 B1 | 8/2018 | Brooker et al. |
| 10,067,801 B1 | 9/2018 | Wagner |
| 10,108,443 B2 | 10/2018 | Wagner et al. |
| 10,140,137 B2 | 11/2018 | Wagner |
| 2002/0172273 A1 | 11/2002 | Baker et al. |
| 2003/0071842 A1 | 4/2003 | King et al. |
| 2003/0084434 A1 | 5/2003 | Ren |
| 2003/0229794 A1 | 12/2003 | James, II et al. |
| 2004/0003087 A1 | 1/2004 | Chambliss et al. |
| 2004/0098154 A1 | 5/2004 | Mccarthy |
| 2004/0249947 A1 | 12/2004 | Novaes et al. |
| 2004/0268358 A1 | 12/2004 | Darling et al. |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |
| 2005/0193113 A1 | 9/2005 | Kokusho et al. |
| 2005/0193283 A1 | 9/2005 | Reinhardt et al. |
| 2005/0257051 A1 | 11/2005 | Richard |
| 2006/0123066 A1 | 6/2006 | Jacobs et al. |
| 2006/0129684 A1 | 6/2006 | Datta |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0242647 A1 | 10/2006 | Kimbrel et al. |
| 2006/0248195 A1 | 11/2006 | Toumura et al. |
| 2007/0094396 A1 | 4/2007 | Takano et al. |
| 2007/0130341 A1 | 6/2007 | Ma |
| 2007/0199000 A1 * | 8/2007 | Shekhel ................. G06F 9/468 719/330 |
| 2007/0220009 A1 | 9/2007 | Morris et al. |
| 2007/0255604 A1 | 11/2007 | Seelig |
| 2008/0028409 A1 | 1/2008 | Cherkasova et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0126110 A1 | 5/2008 | Haeberle et al. |
| 2008/0126486 A1 | 5/2008 | Heist |
| 2008/0147893 A1 | 6/2008 | Marripudi et al. |
| 2008/0189468 A1 | 8/2008 | Schmidt et al. |

(56) References Cited

U.S. PATENT DOCUMENTS

| | | |
|---|---|---|
| 2008/0201711 A1 | 8/2008 | Amir Husain |
| 2008/0209423 A1 | 8/2008 | Hirai |
| 2009/0013153 A1 | 1/2009 | Hilton |
| 2009/0025009 A1 | 1/2009 | Brunswig et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0193410 A1 | 7/2009 | Arthursson et al. |
| 2009/0198769 A1 | 8/2009 | Keller et al. |
| 2009/0204960 A1 | 8/2009 | Ben-yehuda et al. |
| 2009/0204964 A1 | 8/2009 | Foley et al. |
| 2009/0222922 A1 | 9/2009 | Sidiroglou et al. |
| 2009/0288084 A1 | 11/2009 | Astete et al. |
| 2009/0300599 A1 | 12/2009 | Piotrowski |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0269109 A1 | 10/2010 | Cartales |
| 2010/0325727 A1 | 12/2010 | Neystadt et al. |
| 2011/0010722 A1 | 1/2011 | Matsuyama |
| 2011/0029970 A1 | 2/2011 | Arasaratnam |
| 2011/0055378 A1 | 3/2011 | Ferris et al. |
| 2011/0055396 A1 | 3/2011 | DeHaan |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0179162 A1 | 7/2011 | Mayo et al. |
| 2011/0184993 A1 | 7/2011 | Chawla et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0265164 A1 | 10/2011 | Lucovsky |
| 2011/0314465 A1 | 12/2011 | Smith et al. |
| 2011/0321033 A1 | 12/2011 | Kelkar et al. |
| 2012/0011496 A1 | 1/2012 | Shimamura |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0072762 A1 | 3/2012 | Atchison et al. |
| 2012/0072914 A1 | 3/2012 | Ota |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0131379 A1 | 5/2012 | Tameshige et al. |
| 2012/0192184 A1 | 7/2012 | Burckart et al. |
| 2012/0197958 A1 | 8/2012 | Nightingale et al. |
| 2012/0233464 A1 | 9/2012 | Miller et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0067494 A1 | 3/2013 | Srour et al. |
| 2013/0080641 A1 | 3/2013 | Lui et al. |
| 2013/0097601 A1 | 4/2013 | Podvratnik et al. |
| 2013/0111469 A1 | 5/2013 | B et al. |
| 2013/0132942 A1 | 5/2013 | Wang |
| 2013/0139152 A1 | 5/2013 | Chang et al. |
| 2013/0139166 A1 | 5/2013 | Zhang et al. |
| 2013/0151648 A1 | 6/2013 | Luna |
| 2013/0152047 A1 | 6/2013 | Moorthi et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0185719 A1 | 7/2013 | Kar et al. |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | Mcgrath |
| 2013/0227641 A1 | 8/2013 | White et al. |
| 2013/0232480 A1 | 9/2013 | Winterfeldt et al. |
| 2013/0239125 A1 | 9/2013 | Iorio |
| 2013/0262556 A1 | 10/2013 | Xu et al. |
| 2013/0263117 A1 | 10/2013 | Konik et al. |
| 2013/0275969 A1 | 10/2013 | Dimitrov |
| 2013/0275975 A1 | 10/2013 | Masuda et al. |
| 2013/0290538 A1 | 10/2013 | Gmach et al. |
| 2013/0297964 A1 | 11/2013 | Hegdal et al. |
| 2013/0339950 A1 | 12/2013 | Ramarathinam et al. |
| 2013/0346946 A1 | 12/2013 | Pinnix |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068611 A1 | 3/2014 | McGrath et al. |
| 2014/0082165 A1 | 3/2014 | Marr et al. |
| 2014/0101649 A1 | 4/2014 | Kamble et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0201735 A1 | 7/2014 | Kannan et al. |
| 2014/0207912 A1 | 7/2014 | Thibeault |
| 2014/0215073 A1 | 7/2014 | Dow et al. |
| 2014/0245297 A1 | 8/2014 | Hackett |
| 2014/0279581 A1 | 9/2014 | Devereaux |
| 2014/0280325 A1 | 9/2014 | Krishnamurthy et al. |
| 2014/0282615 A1 | 9/2014 | Cavage et al. |
| 2014/0289286 A1 | 9/2014 | Gusak |
| 2014/0304698 A1 | 10/2014 | Chigurapati et al. |
| 2014/0304815 A1 | 10/2014 | Maeda |
| 2014/0380085 A1 | 12/2014 | Rash et al. |

(56) References Cited

U.S. PATENT DOCUMENTS

| | | |
|---|---|---|
| 2015/0039891 A1 | 2/2015 | Ignatchenko et al. |
| 2015/0040229 A1 | 2/2015 | Chan et al. |
| 2015/0052258 A1 | 2/2015 | Johnson et al. |
| 2015/0058914 A1* | 2/2015 | Yadav ............... H04L 63/1408 726/1 |
| 2015/0074659 A1 | 3/2015 | Madsen et al. |
| 2015/0081885 A1 | 3/2015 | Thomas et al. |
| 2015/0106805 A1 | 4/2015 | Melander et al. |
| 2015/0120928 A1 | 4/2015 | Gummaraju et al. |
| 2015/0135287 A1 | 5/2015 | Medeiros et al. |
| 2015/0142952 A1 | 5/2015 | Bragstad et al. |
| 2015/0143381 A1 | 5/2015 | Chin et al. |
| 2015/0178110 A1 | 6/2015 | Li et al. |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0235144 A1 | 8/2015 | Gusev et al. |
| 2015/0242225 A1 | 8/2015 | Muller et al. |
| 2015/0256621 A1 | 9/2015 | Noda et al. |
| 2015/0261578 A1 | 9/2015 | Greden et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0332048 A1 | 11/2015 | Mooring et al. |
| 2015/0350701 A1 | 12/2015 | Lemus et al. |
| 2015/0356294 A1 | 12/2015 | Tan et al. |
| 2015/0363181 A1 | 12/2015 | Alberti et al. |
| 2015/0370560 A1 | 12/2015 | Tan et al. |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0012099 A1 | 1/2016 | Tuatini et al. |
| 2016/0026486 A1 | 1/2016 | Abdallah |
| 2016/0072727 A1 | 3/2016 | Leafe et al. |
| 2016/0098285 A1 | 4/2016 | Davis et al. |
| 2016/0100036 A1 | 4/2016 | Lo et al. |
| 2016/0117254 A1 | 4/2016 | Susarla et al. |
| 2016/0140180 A1 | 5/2016 | Park et al. |
| 2016/0191420 A1 | 6/2016 | Nagarajan et al. |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0301739 A1 | 10/2016 | Thompson |
| 2016/0350099 A1 | 12/2016 | Suparna et al. |
| 2016/0364265 A1 | 12/2016 | Cao et al. |
| 2016/0371127 A1 | 12/2016 | Antony et al. |
| 2016/0371156 A1 | 12/2016 | Merriman |
| 2016/0378554 A1 | 12/2016 | Gummaraju et al. |
| 2017/0060621 A1 | 3/2017 | Whipple et al. |
| 2017/0083381 A1 | 3/2017 | Cong et al. |
| 2017/0085447 A1 | 3/2017 | Chen et al. |
| 2017/0090961 A1 | 3/2017 | Wagner et al. |
| 2017/0093920 A1 | 3/2017 | Ducatel et al. |
| 2017/0116051 A1 | 4/2017 | Wagner et al. |
| 2017/0177391 A1 | 6/2017 | Wagner et al. |
| 2017/0177413 A1 | 6/2017 | Wisniewski et al. |
| 2017/0192804 A1 | 7/2017 | Wagner |
| 2017/0199766 A1 | 7/2017 | Wagner et al. |
| 2017/0206116 A1 | 7/2017 | Reque et al. |
| 2017/0286143 A1 | 10/2017 | Wagner et al. |
| 2017/0286156 A1 | 10/2017 | Wagner et al. |
| 2017/0371703 A1 | 12/2017 | Wagner et al. |
| 2017/0371706 A1 | 12/2017 | Wagner et al. |
| 2017/0371724 A1 | 12/2017 | Wagner et al. |
| 2018/0004553 A1 | 1/2018 | Wagner et al. |
| 2018/0004572 A1 | 1/2018 | Wagner et al. |
| 2018/0039506 A1 | 2/2018 | Wagner et al. |
| 2018/0067841 A1* | 3/2018 | Mahimkar .......... G06F 11/3668 |
| 2018/0121245 A1 | 5/2018 | Wagner et al. |
| 2018/0143865 A1 | 5/2018 | Wagner et al. |
| 2018/0157568 A1 | 6/2018 | Wagner |
| 2018/0203717 A1 | 7/2018 | Wagner et al. |
| 2018/0210760 A1 | 7/2018 | Wisniewski et al. |
| 2018/0309819 A1 | 10/2018 | Thompson |

FOREIGN PATENT DOCUMENTS

| | | |
|---|---|---|
| JP | 2006-107599 A | 4/2006 |
| JP | 2011257847 A | 12/2011 |
| WO | WO 2008/114454 A1 | 9/2008 |
| WO | WO 2009/137567 A1 | 11/2009 |
| WO | WO 2012/050772 A1 | 4/2012 |
| WO | WO 2013/106257 A1 | 7/2013 |
| WO | WO 2015/078394 A1 | 6/2015 |
| WO | WO 2015/108539 A1 | 7/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/112526 A1 | 6/2017 |
| WO | WO 2017/172440 A1 | 10/2017 |

OTHER PUBLICATIONS

Anonymous: "Docker run reference", Dec. 7, 2015, XP055350246, Retrieved from the Internet: URL:https://web.archive.org/web/20151207111702/https:/docs.docker.com/engine/reference/run/ [retrieved on Feb. 28, 2017].

Adapter Pattern, Wikipedia, https://en.wikipedia.org/w/index.php?title=Adapter_pattern&oldid=654971255, [retrieved May 26, 2016], 6 pages.

Amazon, "AWS Lambda: Developer Guide", Retrieved from the Internet, Jun. 26, 2016, URL: http://docs.aws.amazon.com/lambda/latest/dg/lambda-dg.pdf.

Balazinska et al., Moirae: History-Enhanced Monitoring, Published: 2007, 12 pages.

Ben-Yehuda et al., "Deconstructing Amazon EC2 Spot Instance Pricing", ACM Transactions on Economics and Computation 1.3, 2013, 15 pages.

Czajkowski, G., and L. Daynes, Multitasking Without Compromise: A Virtual Machine Evolution 47(4a):60-73, ACM SIGPLAN Notices—Supplemental Issue, Apr. 2012.

Das et al., Adaptive Stream Processing using Dynamic Batch Sizing, 2014, 13 pages.

Dombrowski, M., et al., Dynamic Monitor Allocation in the Java Virtual Machine, JTRES '13, Oct. 9-11, 2013, pp. 30-37.

Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.

Hoffman, Auto scaling your website with Amazon Web Services (AWS)—Part 2, Cardinalpath, Sep. 2015, 15 pages.

Nakajima, J., et al., Optimizing Virtual Machines Using Hybrid Virtualization, SAC '11, Mar. 21-25, 2011, TaiChung, Taiwan, pp. 573-578.

Qian, H., and D. Medhi, et al., Estimating Optimal Cost of Allocating Virtualized Resources With Dynamic Demand, ITC 2011, Sep. 2011, pp. 320-321.

Shim (computing), Wikipedia, https://en.wikipedia.org/w/index.php?title+Shim_(computing)&oldid+654971528, [retrieved on May 26, 2016], 2 pages.

Vaghani, S.B., Virtual Machine File System, ACM SIGOPS Operating Systems Review 44(4):57-70, Dec. 2010.

Vaquero, L., et al., Dynamically Scaling Applications in the cloud, ACM SIGCOMM Computer Communication Review 41(1):45-52, Jan. 2011.

Yue et al., AC 2012-4107: Using Amazon EC2 in Computer and Network Security Lab Exercises: Design, Results, and Analysis, 2012, American Society for Engineering Education 2012.

Zheng, C., and D. Thain, Integrating Containers into Workflows: A Case Study Using Makeflow, Work Queue, and Docker, VTDC '15, Jun. 15, 2015, Portland, Oregon, pp. 31-38.

(56) References Cited

OTHER PUBLICATIONS

International Search Report and Written Opinion in PCT/US2015/052810 dated Dec. 17, 2015.
International Preliminary Report on Patentability in PCT/US2015/052810 dated Apr. 4, 2017.
International Search Report and Written Opinion in PCT/US2015/052838 dated Dec. 18, 2015.
International Preliminary Report on Patentability in PCT/US2015/052838 dated Apr. 4, 2017.
International Search Report and Written Opinion in PCT/US2015/052833 dated Jan. 13, 2016.
International Preliminary Report on Patentability in PCT/US2015/052833 dated Apr. 4, 2017.
International Search Report and Written Opinion in PCT/US2015/064071 dated Mar. 16, 2016.
International Preliminary Report on Patentability in PCT/US2015/064071 dated Jun. 6, 2017.
International Search Report and Written Opinion in PCT/US2016/016211 dated Apr. 13, 2016.
International Preliminary Report on Patentability in PCT/US2016/016211 dated Aug. 17, 2017.
International Search Report and Written Opinion in PCT/US2016/026514 dated Jun. 8, 2016.
International Preliminary Report on Patentability in PCT/US2016/026514 dated Oct. 10, 2017.
International Search Report and Written Opinion in PCT/US2016/026520 dated Jul. 5, 2016.
International Preliminary Report on Patentability in PCT/US2016/026520 dated Oct. 10, 2017.
International Search Report and Written Opinion in PCT/US2016/054774 dated Dec. 16, 2016.
International Search Report and Written Opinion in PCT/US2016/066997 dated Mar. 20, 2017.
International Search Report and Written Opinion in PCT/US/2017/023564 dated Jun. 6, 2017.
International Search Report and Written Opinion in PCT/US2017/040054 dated Sep. 21, 2017.
International Search Report and Written Opinion in PCT/US2017/039514 dated Oct. 10, 2017.
Bhadani et al., Performance evaluation of web servers using central load balancing policy over virtual machines on cloud, Jan. 2010, 4 pages.
Deis, Container, 2014, 1 page.
Han et al., Lightweight Resource Scaling for Cloud Applications, 2012, 8 pages.
Kamga et al., Extended scheduler for efficient frequency scaling in virtualized systems, Jul. 2012, 8 pages.
Kazempour et al., AASH: an asymmetry-aware scheduler for hypervisors, Jul. 2010, 12 pages.
Kraft et al., 10 performance prediction in consolidated virtualized environments, Mar. 2011, 12 pages.
Krsul et al., "VMPlants: Providing and Managing Virtual Machine Execution Environments for Grid Computing", SuperComputing, 2004. Proceedings of the ACM/IEEESC 2004 Conference Pittsburgh, PA, XP010780332, Nov. 6-12, 2004, 12 pages.
Meng et al., Efficient resource provisioning in compute clouds via VM multiplexing, Jun. 2010, 10 pages.
Merkel, "Docker: Lightweight Linux Containers for Consistent Development and Deployment", Linux Journal, vol. 2014 Issue 239, Mar. 2014, XP055171140, 16 pages.
Monteil, Coupling profile and historical methods to predict execution time of parallel applications. Parallel and Cloud Computing, 2013, <hal-01228236, pp. 81-89.
Stack Overflow, Creating a database connection pool, 2009, 4 pages.
Tan et al., Provisioning for large scale cloud computing services, Jun. 2012, 2 pages.
Yamasaki et al. "Model-based resource selection for efficient virtual cluster deployment", Virtualization Technology in Distributed Computing, ACM, Nov. 2007, pp. 1-7.
Extended Search Report in European Application No. 15846932.0 dated May 3, 2018.
Extended Search Report in European Application No. 15847202.7 dated Sep. 9, 2018.
Extended Search Report in European Application No. 15846542.7 dated Aug. 27, 2018.
International Preliminary Report on Patentability in PCT/US2016/054774 dated Apr. 3, 2018.
International Preliminary Report on Patentability in PCT/US2016/066997 dated Jun. 26, 2018.
International Preliminary Report on Patentability in PCT/US/2017/023564 dated Oct. 2, 2018.

* cited by examiner

DETECTING CODE CHARACTERISTIC ALTERATIONS DUE TO CROSS-SERVICE CALLS

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

DETAILED DESCRIPTION

Figure 1:
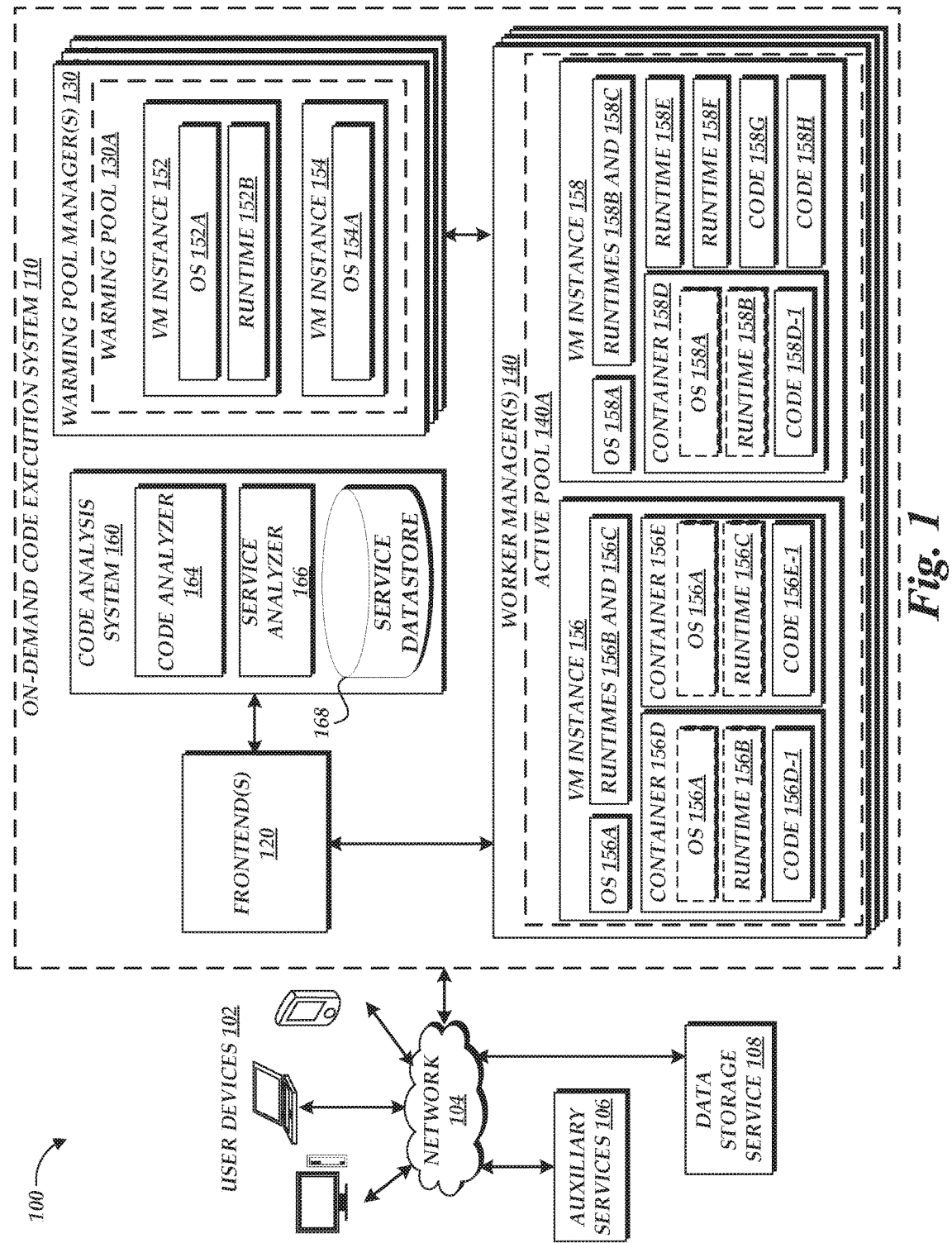
FIG. 1 is a block diagram depicting an illustrative environment in which an on-demand code execution system can operate to execute tasks corresponding to code, which may be submitted by users of the on-demand code execution system, and to enable static analysis of service invocations within the code to identify various potential problems within the code.

Generally described, aspects of the present disclosure relate to an on-demand code execution system. The on-demand code execution system enables rapid execution of code, which may be supplied by users of the on-demand code execution system. The on-demand code execution system further enables such code to depend from or call to other network-based services, including other code on the on-demand code execution system. Thus, the on-demand code execution system enables a high degree of modularization, allowing multiple different code objects, potentially of different languages or architectures, to interact and provide desired functionality. While this modularization can provide many benefits, such as increasing code reusability and programming flexibility, it can in some instances also create difficulties. For example, interpreters or compilers for traditional code provide many functions to benefit a programmer, such as analysis of code to detect potential errors. Generally, this analysis is limited to the code being compiled or interpreted. As such, a compiler or interpreted is generally unable to provide similar analysis to calls to other services (generally referred to herein as a service invocation). As the modularity of code within network-based services grows, the utility of traditional compiler or interpreter analysis thus diminishes. To address these problems, the present disclosure enables a network-based code execution system, such as the on-demand code execution system disclosed herein, to analyze service invocations within code, and to provide many functions similar to those provided by traditional compilers or interpreters for their own native code. Specifically, as discussed herein, the network-based code execution system may analyze service invocations within code to detect potential issues such as parameter mismatches, privilege escalation vulnerabilities, scaling impedance between different services, and alteration of desired code characteristics (such as idempotency) caused by service invocations. Moreover, the network-based code execution system may provide such analysis even for chained invocations, such as where code calls a service which calls other code, etc., thereby providing the beneficial functionalities disclosed herein even in cases of complex calls through multiple network services.

As described in detail herein, the on-demand code execution system may provide a network-accessible service enabling users to submit or designate computer-executable code to be executed by virtual machine instances on the on-demand code execution system. Each set of code on the on-demand code execution system may define a "task," and implement specific functionality corresponding to that task when executed on a virtual machine instance of the on-demand code execution system. Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user). To enable this rapid execution, the on-demand code execution system can include one or more virtual machine instances that are "pre-warmed" or pre-initialized (e.g., booted into an operating system and executing a complete or substantially complete runtime environment) and configured to enable execution of user-defined code, such that the code may be rapidly executed in response to a request to execute the code, without delay caused by initializing the virtual machine instance. Thus, when an execution of a task is triggered, the code corresponding to that task can be executed within a pre-initialized virtual machine in a very short amount of time.

In accordance with embodiments of the present disclosure, the on-demand code execution system may provide assistance to end users when developing code of a task, such as by analyzing code of the task to identify potential errors or concerns. In one embodiment, this analysis can be completed "statically," without requiring execution of the code being analyzed. Such analysis is referred to herein as "static analysis." For example, code of a newly submitted task may be analyzed at the on-demand code execution system to determine that parameters passed within a service invocation (e.g., an API call) will result in an error when executing the task, to determine that the code of the task is vulnerable to a privilege escalation (e.g., beyond security parameters set for the task), to determine that a particular service invocation will alter desirable characteristics of the code (such as idempotency), or to determine an impedance mismatch between the code and a service invoked (either indirectly or directly) from the code. As discussed below, this analysis may be conducted along an "execution chain" of the task, and thus include both services invoked directly from the task (e.g., via an API call in code of the task) and services invoked indirectly from the task (e.g., services invoked by virtue of an action of the code, such as a call to another service, without being directly called).

In one embodiment, static analysis of service invocations within code of a task may be facilitated by maintaining, at the on-demand code execution system, a datastore of information regarding services. The information may include, for example, security information for the service, execution capacity for the service, code characteristics of the service, expected inputs into an invocation of the service, and information mapping the inputs into an output (e.g., as a write to a particular network location, another service invocation, etc.). Thus, when a service invocation is detected within code of a task, information of the service can be retrieved from the datastore and used to determine any potential issues caused by the invocation, as well as any subsequent invocations caused indirectly by the service invocation. The on-demand code execution system may then iterate through all service invocations of the code (e.g., both direct an indirect) to detect potential errors or issues within the invocations and report those issues to a programmer.

While the static analysis discussed herein may not require execution of the code being analyzed, it may nonetheless utilize information regarded past executions of the code or other services when available. For example, in one embodiment, service information may be compiled by the on-demand code execution system by monitoring past invocations (which may also be referred to herein as "calls") to a particular service. Illustratively, the on-demand code execution system may in some embodiments insert monitoring information into code (e.g., of other tasks) in order to generate a call graph for the code. This call graph information may then be used to determine information for any service invocations included within the code (e.g., to detect indirect service calls caused by the service invocations). Illustrative embodiments for inserting tracking information into code execution on an on-demand code execution system are disclosed within U.S. Pat. No. 9,811,434 to Wagner (the "'434 Patent"), the entirety of which is hereby incorporated by reference. In other instances, the on-demand code execution system may determine service information without analysis of past code execution, such as by querying an API endpoint of a service for the service information, which may for example be encoded in a standardized format readable by the on-demand code execution system (e.g., as an XML file).

As will be appreciated by one of skill in the art in light of the present disclosure, the embodiments disclosed herein improves the ability of computing systems, such as on-demand code execution systems, to provide beneficial code analysis functionalities to end users not possible under prior systems. Moreover, the presently disclosed embodiments address technical problems inherent within computing systems; specifically, the limited ability of computers to analyze and detect errors within executable code, particularly across different code objects of potentially different languages or architectures. These technical problems are addressed by the various technical solutions described herein, including implementation of a code analysis system to provide static analysis of code including both direct and indirect calls to other network-based services. Thus, the present disclosure represents an improvement on existing code execution systems and computing systems in general.

The general execution of tasks on the on-demand code execution system will now be discussed. Specifically, to execute tasks, the on-demand code execution system described herein may maintain a pool of pre-initialized virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels. Illustratively, the on-demand code execution system may maintain a pool of virtual machine instances on one or more physical computing devices, where each virtual machine instance has one or more software components (e.g., operating systems, language runtimes, libraries, etc.) loaded thereon. When the on-demand code execution system receives a request to execute the program code of a user (a "task"), which specifies one or more computing constraints for executing the program code of the user, the on-demand code execution system may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution system may include a virtual machine instance manager configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identifies a pre-configured virtual machine instance to execute the code based on configuration information associated with the request. The virtual machine instance manager can further allocate the identified virtual machine instance to execute the user's code at least partly by creating and configuring containers inside the allocated virtual machine instance, and provisioning the containers with code of the task as well as dependency code objects. Various embodiments for implementing a virtual machine instance manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE" and filed Sep. 30, 2014 ("the '556 Patent"), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which an on-demand code execution system 110 may operate based on communication with user computing devices 102, auxiliary services 106, and network-based data storage services 108. By way of illustration, various example user computing devices 102 are shown in communication with the on-demand code execution system 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLI), application programming interfaces (API), and/or other programmatic interfaces for generating and uploading user-executable code (e.g., including metadata identifying dependency code objects for the uploaded code), invoking the user-provided code (e.g., submitting a request to execute the user codes on the on-demand code execution system 110), scheduling event-based jobs or timed jobs, tracking the user-provided code, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the one-demand code execution environment 110 to implement desired functionality on behalf of a user. Auxiliary services 106 can correspond to network-connected computing devices, such as servers, which generate data accessible to the one-demand code execution environment 110 or otherwise communicate to the on-demand code execution environment 110. For example, the auxiliary services 106 can include web services (e.g., associated with the user computing devices 102, with the on-demand code execution system 110, or with third parties), databases, really simple syndication ("RSS") readers, social networking sites, or any other source of network-accessible service or data source. In some instances, auxiliary services 106 may be invoked by code execution on the on-demand code execution system 110, such as by API calls to the auxiliary services 106. In some instances, auxiliary services 106 may be associated with the on-demand code execution system 110, e.g., to provide billing or logging services to the on-demand code execution system 110. In some instances, auxiliary services 106 actively transmit information, such as API calls or other task-triggering information, to the on-demand code execution system 110. In other instances, auxiliary services 106 may be passive, such that data is made available for access by the on-demand code execution system 110. For example, components of the on-demand code execution system 110 may periodically poll such passive data sources, and trigger execution of tasks within the on-demand code execution system 110 based on the data provided. While depicted in FIG. 1 as distinct from the user computing devices 102 and the on-demand code execution system 110, in some embodiments, various auxiliary services 106 may be implemented by either the user computing devices 102 or the on-demand code execution system 110.

The illustrative environment 100 further includes one or more network-based data storage services 108, configured to enable the on-demand code execution system 110 to store and retrieve data from one or more persistent or substantially persistent data sources. Illustratively, the network-based data storage services 108 may enable the on-demand code execution system 110 to store information corresponding to a task, such as code or metadata, to store additional code objects representing dependencies of tasks, to retrieve data to be processed during execution of a task, and to store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. The network-based data storage services 108 may further enable the on-demand code execution system 110 to query for and retrieve information regarding data stored within the on-demand code execution system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The user computing devices 102, auxiliary services 106, and network-based data storage services 108 may communicate with the on-demand code execution system 110 via network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution system 110 is depicted in FIG. 1 as operating in a distributed computing environment including several computer systems that are interconnected using one or more computer networks (not shown in FIG. 1). The on-demand code execution system 110 could also operate within a computing environment having a fewer or greater number of devices than are illustrated in FIG. 1. Thus, the depiction of the on-demand code execution system 110 in FIG. 1 should be taken as illustrative and not limiting to the present disclosure. For example, the on-demand code execution system 110 or various constituents thereof could implement various Web services components, hosted or "cloud" computing environments, and/or peer to peer network configurations to implement at least a portion of the processes described herein.

Further, the on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the on-demand code execution system 110 is illustrated as connected to the network 104. In some embodiments, any of the components within the on-demand code execution system 110 can communicate with other components of the on-demand code execution system 110 via the network 104. In other embodiments, not all components of the on-demand code execution system 110 are capable of communicating with other components of the virtual environment 100. In one example, only the frontend 120 (which may in some instances represent multiple frontends 120) may be connected to the network 104, and other components of the on-demand code execution system 110 may communicate with other components of the environment 100 via the frontends 120.

In FIG. 1, users, by way of user computing devices 102, may interact with the on-demand code execution system 110 to provide executable code, and establish rules or logic defining when and how such code should be executed on the on-demand code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code using one or more pre-established virtual machine instances. The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying). In accordance with embodiments of the present disclosure, the tasks established by a user may reference additional code objects on the on-demand code execution system 110. As will be described below, the on-demand code execution system 110 can be configured to provision an execution environment for a task with these additional code objects to facilitate execution of the task.

To enable interaction with the on-demand code execution system 110, the system 110 includes one or more frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of computer executable code. The frontends 120 include a variety of components to enable interaction between the on-demand code execution system 110 and other computing devices. For example, each frontend 120 may include a request interface 122 providing user computing devices 102 with the ability to upload or otherwise communication user-specified code to the on-demand code execution system 110 and to thereafter request execution of that code. In one embodiment, the request interface 122 communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110. As noted above, the code for a task may reference additional code objects maintained at the on-demand code execution system 110 by use of identifiers of those code objects, such that the code objects are combined with the code of a task in an execution environment prior to execution of the task. The on-demand code execution system 110 may vary its execution strategy for a task based on where the code of the task is available at the time a call for the task is processed. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task may specify one or more third-party libraries (including native libraries) to be used along with the user code corresponding to the task. In one embodiment, the call may provide to the on-demand code execution system 110 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 110 (e.g., standard routines), and/or provided by third parties. Illustratively, code not included within a call or previously uploaded by the user may be referenced within metadata of the task by use of a URI associated with the code. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network). In some embodiments, individual code objects may also be associated with permissions or authorizations. For example, a third party may submit a code object and designate the object as readable by only a subset of users. The on-demand code execution system 110 may include functionality to enforce these permissions or authorizations with respect to code objects.

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc. may also be enabled or disabled based on the indication provided in a call.

To manage requests for code execution, the frontend 120 can include an execution queue (not shown in FIG. 1), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue 124 and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

As noted above, tasks may be triggered for execution at the on-demand code execution system 110 based on explicit calls from user computing devices 102 (e.g., as received at the request interface 122). Alternatively or additionally, tasks may be triggered for execution at the on-demand code execution system 110 based on data retrieved from one or more auxiliary services 106 or network-based data storage services 108. To facilitate interaction with auxiliary services 106, the frontend 120 can include a polling interface (not shown in FIG. 1), which operates to poll auxiliary services 106 or data storage services 108 for data. Illustratively, the polling interface may periodically transmit a request to one or more user-specified auxiliary services 106 or data storage services 108 to retrieve any newly available data (e.g., social network "posts," news articles, files, records, etc.), and to determine whether that data corresponds to user-established criteria triggering execution a task on the on-demand code execution system 110. Illustratively, criteria for execution of a task may include, but is not limited to, whether new data is available at the auxiliary services 106 or data storage services 108, the type or content of the data, or timing information corresponding to the data. In some instances, the auxiliary services 106 or data storage services 108 may function to notify the frontend 120 of the availability of new data, and thus the polling service may be unnecessary with respect to such services.

In addition to tasks executed based on explicit user calls and data from auxiliary services 106, the on-demand code execution system 110 may in some instances operate to trigger execution of tasks independently. For example, the on-demand code execution system 110 may operate (based on instructions from a user) to trigger execution of a task at each of a number of specified time intervals (e.g., every 10 minutes).

The frontend 120 can further includes an output interface (not shown in FIG. 1) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

As shown in FIG. 1, in some embodiments, the on-demand code execution system 110 may include multiple frontends 120. In such embodiments, a load balancer (not shown in FIG. 1) may be provided to distribute the incoming calls to the multiple frontends 120, for example, in a round-robin fashion. In some embodiments, the manner in which the load balancer distributes incoming calls to the multiple frontends 120 may be based on the location or state of other components of the on-demand code execution system 110. For example, a load balancer may distribute calls to a geographically nearby frontend 120, or to a frontend with capacity to service the call. In instances where each frontend 120 corresponds to an individual instance of another component of the on-demand code execution system, such as the warming pools 130A or active pools 140A described below, the load balancer may distribute calls according to the capacities or loads on those other components. As will be described in more detail below, calls may in some instances be distributed between frontends 120 deterministically, such that a given call to execute a task will always (or almost always) be routed to the same frontend 120. This may, for example, assist in maintaining an accurate execution record for a task, to ensure that the task executes only a desired number of times. While distribution of calls via a load balancer is illustratively described, other distribution techniques, such as anycast routing, will be apparent to those of skill in the art.

To execute tasks, the on-demand code execution system 110 includes one or more warming pool managers 130, which "pre-warm" (e.g., initialize) virtual machine instances to enable tasks to be executed quickly, without the delay caused by initialization of the virtual machines. The on-demand code execution system 110 further includes one or more worker managers 140, which manage active virtual machine instances (e.g., currently assigned to execute tasks in response to task calls).

The warming pool managers 130 ensure that virtual machine instances are ready to be used by the worker managers 140 when the on-demand code execution system 110 detects an event triggering execution of a task on the on-demand code execution system 110. In the example illustrated in FIG. 1, each warming pool manager 130 manages a corresponding warming pool 130A, which is a group (sometimes referred to as a pool) of pre-initialized and pre-configured virtual machine instances that may be used to execute tasks in response to triggering of those tasks. In some embodiments, the warming pool managers 130 cause virtual machine instances to be booted up on one or more physical computing machines within the on-demand code execution system 110 and added to a corresponding warming pool 130A. For example, each warming pool manager 130 may cause additional instances to be added to the corresponding warming pool 130A based on the available capacity in the corresponding warming pool 130A to service incoming calls. As will be described below, the warming pool managers 130 may further work in conjunction with other components of the on-demand code execution system 110, such as the worker managers 140, to add or otherwise manage instances and/or containers in the warming pools 130A based on received pre-trigger notifications. In some embodiments, the warming pool managers 130 may use both physical computing devices within the on-demand code execution system 110 and one or more virtual machine instance services to acquire and maintain compute capacity that can be used to service calls received by the frontends 120. Further, the on-demand code execution system 110 may comprise one or more logical knobs or switches for controlling (e.g., increasing or decreasing) the available capacity in the warming pools 130A. For example, a system administrator may use such a knob or switch to increase the capacity available (e.g., the number of pre-booted instances) in the warming pools 130A during peak hours. In some embodiments, virtual machine instances in the warming pools 130A can be configured based on a predetermined set of configurations independent from a specific call to execute a task. The predetermined set of configurations can correspond to various types of virtual machine instances to execute tasks. The warming pool managers 130 can optimize types and numbers of virtual machine instances in the warming pools 130A based on one or more metrics related to current or previous task executions. Further, the warming pool managers 130 can establish or modify the types and number of virtual machine instances in the warming pools 130A based on pre-trigger notifications (e.g., by pre-initializing one or more virtual machine instances based on requirements of a task expected to be executed based on a received pre-trigger notification).

As shown in FIG. 1, instances may have operating systems (OS) and/or language runtimes loaded thereon. For example, the warming pool 130A managed by a warming pool manager 130 can comprise instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool managers 130 may maintain a list of instances in a corresponding warming pool 130A. The list of instances may further specify the configuration (e.g., OS, runtime, container, etc.) of the instances.

In some embodiments, the virtual machine instances in a warming pool 130A may be used to serve any user's calls. In one embodiment, all the virtual machine instances in a warming pool 130A are configured in the same or substantially similar manner. In another embodiment, the virtual machine instances in a warming pool 130A may be configured differently to suit the needs of different users. For example, the virtual machine instances may have different operating systems, different language runtimes, and/or different libraries loaded thereon. In yet another embodiment, the virtual machine instances in a warming pool 130A may be configured in the same or substantially similar manner (e.g., with the same OS, language runtimes, and/or libraries), but some of those instances may have different container configurations. For example, one instance might have a container created therein for running code written in Python, and another instance might have a container created therein for running code written in Ruby.

The warming pool managers 130 may pre-configure the virtual machine instances in a warming pool 130A, such that each virtual machine instance is configured to satisfy at least one of the operating conditions that may be requested or specified by a user when defining a task. In one embodiment, the operating conditions may include program languages in which the potential user code of a task may be written. For example, such languages may include Java, JavaScript, Python, Ruby, and the like. In some embodiments, the set of languages that the user code of a task may be written in may be limited to a predetermined set (e.g., set of 4 languages, although in some embodiments sets of more or less than four languages are provided) in order to facilitate pre-initialization of the virtual machine instances that can satisfy calls to execute the task. For example, when the user is configuring a task via a user interface provided by the on-demand code execution system 110, the user interface may prompt the user to specify one of the predetermined operating conditions for executing the task. In another example, the service-level agreement (SLA) for utilizing the services provided by the on-demand code execution system 110 may specify a set of conditions (e.g., programming languages, computing resources, etc.) that tasks should satisfy, and the on-demand code execution system 110 may assume that the tasks satisfy the set of conditions in handling the requests. In another example, operating conditions specified by a task may include: the amount of compute power to be used for executing the task; the type of triggering event for a task (e.g., an API call, HTTP packet transmission, detection of a specific data at an auxiliary service 106); the timeout for the task (e.g., threshold time after which an execution of the task may be terminated); and security policies (e.g., may control which instances in the warming pools 130A are usable by which user), among other specified conditions.

One or more worker managers 140 manage the instances used for servicing incoming calls to execute tasks. In the example illustrated in FIG. 1, each worker managers 140 manages an active pool 140A, which is a group (sometimes referred to as a pool) of virtual machine instances, implemented by one or more physical host computing devices, that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker managers 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution system 110). In some embodiments, the requests associated with the same user group may share the same containers (e.g., if the user codes associated therewith are identical). In some embodiments, a task does not differentiate between the different users of the group and simply indicates the group to which the users associated with the task belong.

As shown in FIG. 1, instances may have operating systems (OS), language runtimes, and containers. The containers may have individual copies of the OS, the runtimes, and user codes corresponding to various tasks loaded thereon. In the example of FIG. 1, the active pools 140A managed by a worker manager 140 includes the instances 156, 158. The instance 156 has an OS 156A, runtimes 156B, 156C, and containers 156D, 156E. The container 156D includes a copy of the OS 156A, a copy of the runtime 156B, and a copy of a code 156D-1. The container 156E includes a copy of the OS 156A, a copy of the runtime 156C, and a copy of a code 156E-1. The instance 158 has an OS 158A, runtimes 158B, 158C, 158E, 158F, a container 158D, and codes 158G, 158H. The container 158D has a copy of the OS 158A, a copy of the runtime 158B, and a copy of a code 158D-1. As illustrated in FIG. 1, instances may have user codes loaded thereon, and containers within those instances may also have user codes loaded therein. In some embodiments, the runtimes may also be user provided. In some embodiments, the worker managers 140 may maintain a list of instances in an active pool 140A. The list of instances may further specify the configuration (e.g., OS, runtime, container, etc.) of the instances. In some embodiments, the worker managers 140 may have access to a list of instances in a warming pool 130A (e.g., including the number and type of instances). In other embodiments, the worker managers 140 requests compute capacity from a warming pool manager 130 without having knowledge of the virtual machine instances in a warming pool 130A.

In the example illustrated in FIG. 1, tasks are executed in isolated execution environments referred to as containers (e.g., containers 156D, 156E, 158D). Containers are logical units created within a virtual machine instance using the resources available on that instance. For example, each worker manager 140 may, based on information specified in a call to execute a task, create a new container or locate an existing container in one of the instances in an active pool 140A and assigns the container to the call to handle the execution of the task. In one embodiment, such containers are implemented as Linux containers.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus, the frontend 120 may pass most or all requests to that worker manager 140. In another embodiment, a frontend 120 may include a location selector 126 configured to determine a worker manager 140 to which to pass the execution request. Illustratively, to assist in implementation of execution guarantees, the location selector 126 to select the same worker manager 140 to receive each call to a task to the same worker manager 140, such that the worker manager 140 can maintain an authoritative execution record for the task. In one embodiment, the location selector 126 may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

On receiving a request to execute a task, a worker manager 140 finds capacity to execute a task on the on-demand code execution system 110. For example, if there exists a particular virtual machine instance in the active pool 140A that has a container with the user code of the task already loaded therein (e.g., code 156D-1 shown in the container 156D), the worker manager 140 may assign the container to the task and cause the task to be executed in the container. Alternatively, if the user code of the task is available in the local cache of one of the virtual machine instances (e.g., codes 158G, 158H, which are stored on the instance 158 but do not belong to any individual containers), the worker manager 140 may create a new container on such an instance, assign the container to the task, and cause the user code of the task to be loaded and executed in the container.

If the worker manager 140 determines that the user code associated with the triggered task is not found on any of the instances (e.g., either in a container or the local cache of an instance) in the active pool 140A, the worker manager 140 may determine whether any of the instances in the active pool 140A is currently assigned to the user associated with the triggered task and has compute capacity to handle the triggered task. If there is such an instance, the worker manager 140 may create a new container on the instance and assign the container to execute the triggered task. Alternatively, the worker manager 140 may further configure an existing container on the instance assigned to the user, and assign the container to the triggered task. For example, the worker manager 140 may determine that the existing container may be used to execute the task if a particular library demanded by the task is loaded thereon. In such a case, the worker manager 140 may load the particular library and the code of the task onto the container and use the container to execute the task.

If the active pool 140 does not contain any instances currently assigned to the user, the worker manager 140 pulls a new virtual machine instance from the warming pool 130A, assigns the instance to the user associated with the triggered task, creates a new container on the instance, assigns the container to the triggered task, and causes the user code of the task to be downloaded and executed on the container.

In some embodiments, the on-demand code execution system 110 is adapted to begin execution of a task shortly after it is received (e.g., by the frontend 120). A time period can be determined as the difference in time between initiating execution of the task (e.g., in a container on a virtual machine instance associated with the user) and detecting an event that triggers execution of the task (e.g., a call received by the frontend 120). The on-demand code execution system 110 is adapted to begin execution of a task within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the on-demand code execution system 110 is adapted to begin execution of a task within a time period that is less than a predetermined duration if one or more conditions are satisfied. For example, the one or more conditions may include any one of: (1) the user code of the task is loaded on a container in the active pool 140 at the time the request is received; (2) the user code of the task is stored in the code cache of an instance in the active pool 140 at the time the call to the task is received; (3) the active pool 140A contains an instance assigned to the user associated with the call at the time the call is received; or (4) the warming pool 130A has capacity to handle the task at the time the event triggering execution of the task is detected.

Once the worker manager 140 locates one of the virtual machine instances in the warming pool 130A that can be used to execute a task, the warming pool manager 130 or the worker manger 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to execute tasks of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity.

In some embodiments, the on-demand code execution system 110 may maintain a separate cache in which code of tasks are stored to serve as an intermediate level of caching system between the local cache of the virtual machine instances and the account data store 164 (or other network-based storage not shown in FIG. 1). The various scenarios that the worker manager 140 may encounter in servicing the call are described in greater detail within the '556 Patent, incorporated by reference above (e.g., at FIG. 4 of the '556 Patent).

After the task has been executed, the worker manager 140 may tear down the container used to execute the task to free up the resources it occupied to be used for other containers in the instance. Alternatively, the worker manager 140 may keep the container running to use it to service additional calls from the same user. For example, if another call associated with the same task that has already been loaded in the container, the call can be assigned to the same container, thereby eliminating the delay associated with creating a new container and loading the code of the task in the container. In some embodiments, the worker manager 140 may tear down the instance in which the container used to execute the task was created. Alternatively, the worker manager 140 may keep the instance running to use it to service additional calls from the same user. The determination of whether to keep the container and/or the instance running after the task is done executing may be based on a threshold time, the type of the user, average task execution volume of the user, and/or other operating conditions. For example, after a threshold time has passed (e.g., 5 minutes, 30 minutes, 1 hour, 24 hours, 30 days, etc.) without any activity (e.g., task execution), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the on-demand code execution system 110 may provide data to one or more of the auxiliary services 106 as it executes tasks in response to triggering events. For example, the frontends 120 may communicate with the monitoring/logging/billing services included within the auxiliary services 106. The monitoring/logging/billing services may include: a monitoring service for managing monitoring information received from the on-demand code execution system 110, such as statuses of containers and instances on the on-demand code execution system 110; a logging service for managing logging information received from the on-demand code execution system 110, such as activities performed by containers and instances on the on-demand code execution system 110; and a billing service for generating billing information associated with executing user code on the on-demand code execution system 110 (e.g., based on the monitoring information and/or the logging information managed by the monitoring service and the logging service). In addition to the system-level activities that may be performed by the monitoring/logging/billing services (e.g., on behalf of the on-demand code execution system 110), the monitoring/logging/billing services may provide application-level services on behalf of the tasks executed on the on-demand code execution system 110. For example, the monitoring/logging/billing services may monitor and/or log various inputs, outputs, or other data and parameters on behalf of the tasks being executed on the on-demand code execution system 110.

In some embodiments, the worker managers 140 may perform health checks on the instances and containers managed by the worker managers 140 (e.g., those in a corresponding active pool 140A). For example, the health checks performed by a worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, a worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, a worker manager 140 may perform similar health checks on the instances and/or containers in a warming pool 130A. The instances and/or the containers in a warming pool 130A may be managed either together with those instances and containers in an active pool 140A or separately. In some embodiments, in the case where the health of the instances and/or the containers in a warming pool 130A is managed separately from an active pool 140A, a warming pool manager 130, instead of a worker manager 140, may perform the health checks described above on the instances and/or the containers in a warming pool 130A.

In the depicted example, virtual machine instances ("instances") 152, 154 are shown in a warming pool 130A managed by a warming pool manager 130, and instances 156, 158 are shown in an active pool 140A managed by a worker manager 140. The illustration of the various components within the on-demand code execution system 110 is logical in nature and one or more of the components can be implemented by a single computing device or multiple computing devices. For example, the instances 152, 154, 156, 158 can be implemented on one or more physical computing devices in different various geographic regions. Similarly, each frontend 120, warming pool manager 130, and worker manager 140 can be implemented across multiple physical computing devices. Alternatively, one or more of a frontend 120, a warming pool manager 130, and a worker manager 140 can be implemented on a single physical computing device. Although four virtual machine instances are shown in the example of FIG. 1, the embodiments described herein are not limited as such, and one skilled in the art will appreciate that the on-demand code execution system 110 may comprise any number of virtual machine instances implemented using any number of physical computing devices. Similarly, although multiple warming pools 130A and active pools 140A are shown in the example of FIG. 1, the embodiments described herein are not limited as such, and one skilled in the art will appreciate that the on-demand code execution system 110 may comprise any number of warming pools and active pools.

In accordance with embodiments of the present disclosure, the on-demand code execution system 110 may implement a variety of functionalities enabling static analysis of code of a task to be executed on the on-demand code execution system 110. These functionalities may be similar in some instances to functionalities provided by traditional compilers or interpreters, but unlike such traditional systems, function with respect to and across different network services. Thus, for example, the on-demand code execution system 110 may be enabled to notify a user that code may include parameters in an API call that may cause errors during execution, either with the code itself or within services called. As a further example, the on-demand code execution system 110 may be enabled to notify a user that code may include an API call that leaves the code vulnerable to privilege escalation, such as by escaping or circumventing desired security preferences of the code (e.g., as designated within a security profile of the task). As yet another example, the on-demand code execution system 110 may be enabled to notify a user that an API call within code alters desired characteristics of the code (e.g., idempotency) or may cause an impedance mismatch between the code and a called service. Each such functionality may be implemented without requiring execution of the code itself, thereby providing rapid and helpful information to a user when developing a task on the on-demand code execution system 110.

To enable the above-noted analysis, the on-demand code execution system 110 can include a code analysis system 160. The code analysis system 160 can illustratively include a code analyzer 164, a service analyzer 166, and a service datastore 168. Illustratively, the code analyzer may correspond to a computing device to receive code of a task, and to analyze that code to detect service invocations to additional services (which may include, for example, additional instances of the task, other tasks, auxiliary services 106, and the like). During such analysis, the code analyzer 164 may utilize information regarding any services corresponding to detected service invocations, which may be stored in the service datastore 168. Illustrative routines for each analysis noted above are provided below with respect to FIGS. 4-7. The service datastore 168 can correspond to any persistent or substantially persistent data storage device or system. For example, the service datastore 168 may include a collection of hard disk drives (HDDs), SSDs, virtual disk drives, tape drives, network attached storage (NASs) devices, or any other persistent or substantially persistent storage component. The information within the service datastore 168 may include, for example, security information for a particular service (e.g., corresponding to a particular service invocation), characteristic information for the service (e.g., whether the service is idempotent), input information for the service (e.g., expected types and numbers of parameters to be passed to the service), and output information for the service (e.g., specified with reference to the input information, such as a transformation to be made to the input information). The information within the service datastore 168 may be populated, for example, by the service analyzer 166, which may correspond to a computing device configured to determine service information for a given service. In one embodiment, the service analyzer 166 functions based on direct interaction with a service, such as by sending a request for information to the service and interpreting a response (e.g., XML data) including service information for the service. In another embodiment, the service analyzer 166 functions to indirectly determine service information for a service, such as by monitoring invocations of the service made during past task executions on the on-demand code execution system 110 and responses to such invocations, and analyzing those invocations and responses to determine the service information. In one embodiment, the service analyzer 166 applies machine learning techniques to determine service information. For example, the service analyzer 166 may generate a neural network learning model using the calls to the service made during past task executions on the on-demand code execution system 110 and responses to such calls, to determine aspects such as expected inputs (e.g., those that do and do not result in errors), outputs based on inputs, or code characteristics (e.g., whether the same input always results in the same output, an indicator of idempotency).

While some functionalities are generally described herein with reference to an individual component of the on-demand code execution system 110, other components or a combination of components may additionally or alternatively implement such functionalities. For example, a worker manager 140 may operate to package code objects for tasks or to analyze dependency graphs for a task, in a manner similar or identical to as described herein with reference to a packaging system 160.

Figure 2:
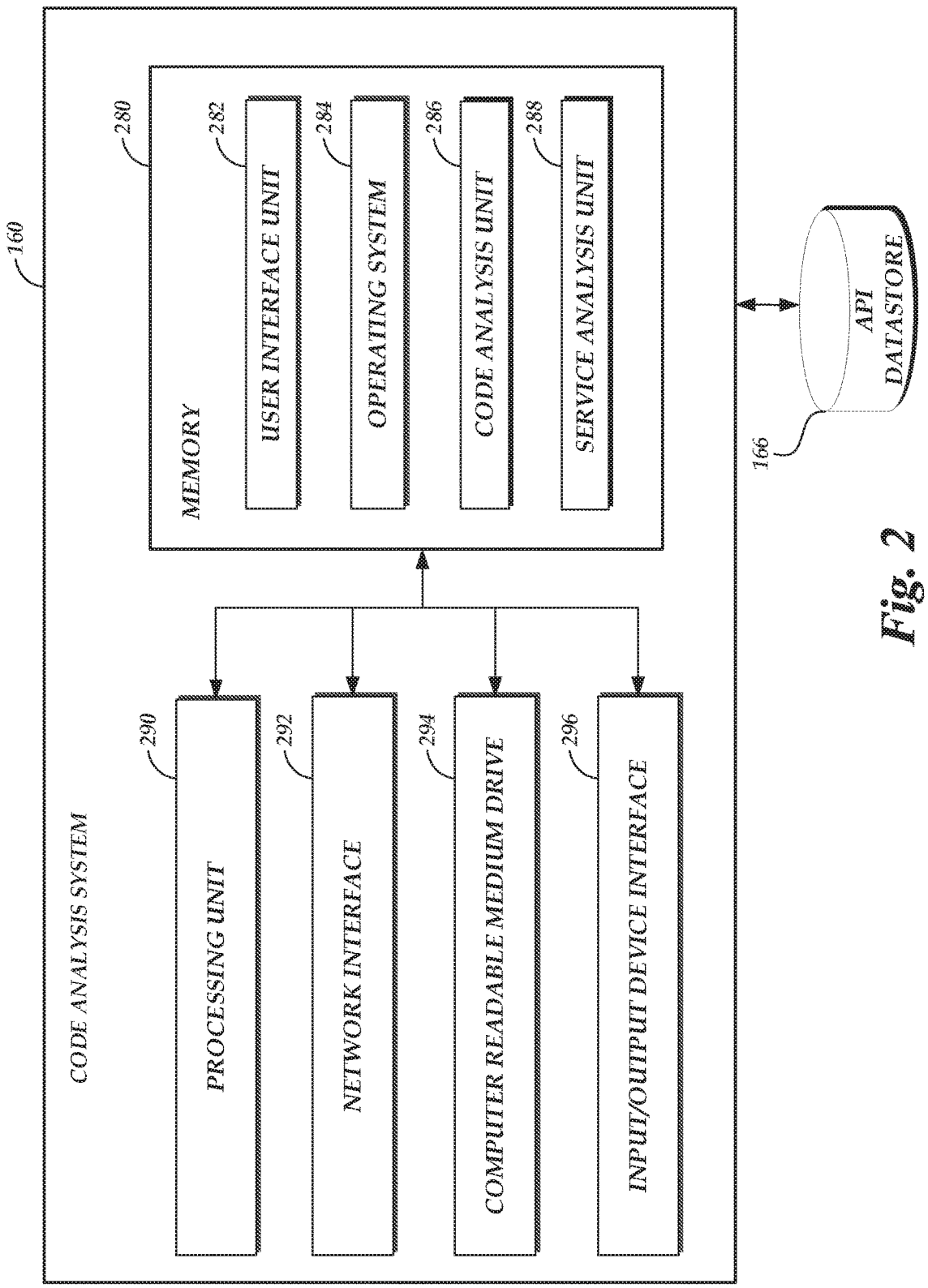
FIG. 2 depicts a general architecture of a computing device providing a code analysis system that is configured to facilitate analysis of service invocations within code of tasks on the on-demand code execution system of FIG. 1.

FIG. 2 depicts a general architecture of a computing system (referenced as code analysis system 160) that operates to conduct static analysis of code of a task on the on-demand code execution system 110 and to generate notify users of potential issues with such code. The general architecture of the code analysis system 160 depicted in FIG. 2 includes an arrangement of computer hardware and software modules that may be used to implement aspects of the present disclosure. The hardware modules may be implemented with physical electronic devices, as discussed in greater detail below. The code analysis system 160 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the code analysis system 160 includes a processing unit 290, a network interface 292, a computer readable medium drive 294, and an input/output device interface 296, all of which may communicate with one another by way of a communication bus. The network interface 192 may provide connectivity to one or more networks or computing systems. The processing unit 290 may thus receive information and instructions from other computing systems or services via the network 204. The processing unit 290 may also communicate to and from memory 280 and further provide output information for an optional display (not shown) via the input/output device interface 296. The input/output device interface 296 may also accept input from an optional input device (not shown).

The memory 280 may contain computer program instructions (grouped as modules in some embodiments) that the processing unit 290 executes in order to implement one or more aspects of the present disclosure. The memory 280 generally includes random access memory (RAM), read only memory (ROM) and/or other persistent, auxiliary or non-transitory computer readable media. The memory 280 may store an operating system 284 that provides computer program instructions for use by the processing unit 290 in the general administration and operation of the code analysis system 160. The memory 280 may further include computer program instructions and other information for implementing aspects of the present disclosure. For example, in one embodiment, the memory 280 includes a user interface unit 282 that generates user interfaces (and/or instructions therefor) for display upon a computing device, e.g., via a navigation and/or browsing interface such as a browser or application installed on the computing device. In addition, the memory 280 may include and/or communicate with one or more data repositories (not shown), for example, to access user program codes and/or libraries.

In addition to and/or in combination with the user interface unit 282, the memory 280 may include a code analysis unit 286 and a service analysis unit 288 that may be executed by the processing unit 290. In one embodiment, the code analysis unit 286 and service analysis unit 288 individually or collectively implement various aspects of the present disclosure, e.g., static analyzing code of tasks within the on-demand code execution system 110 and to notifying users of potential issues with the code, analyzing services to generate service information for the services, etc., as described further below.

While the code analysis unit 286 and service analysis unit 288 are shown in FIG. 2 as part of the code analysis system 160, in other embodiments, all or a portion of the instance code analysis unit 286 and service analysis unit 288 may be implemented by other components of the on-demand code execution system 110 and/or another computing device. For example, in certain embodiments of the present disclosure, another computing device in communication with the on-demand code execution system 110 may include several modules or components that operate similarly to the modules and components illustrated as part of the code analysis system 160.

In some embodiments, the code analysis system 160 may further include components other than those illustrated in FIG. 2. For example, the memory 280 may further include an instance allocation unit for allocating execution environments to tasks, user code execution unit to facilitate execution of tasks within the execution environments, or a container manager for managing creation, preparation, and configuration of containers within virtual machine instances.

Figure 3:
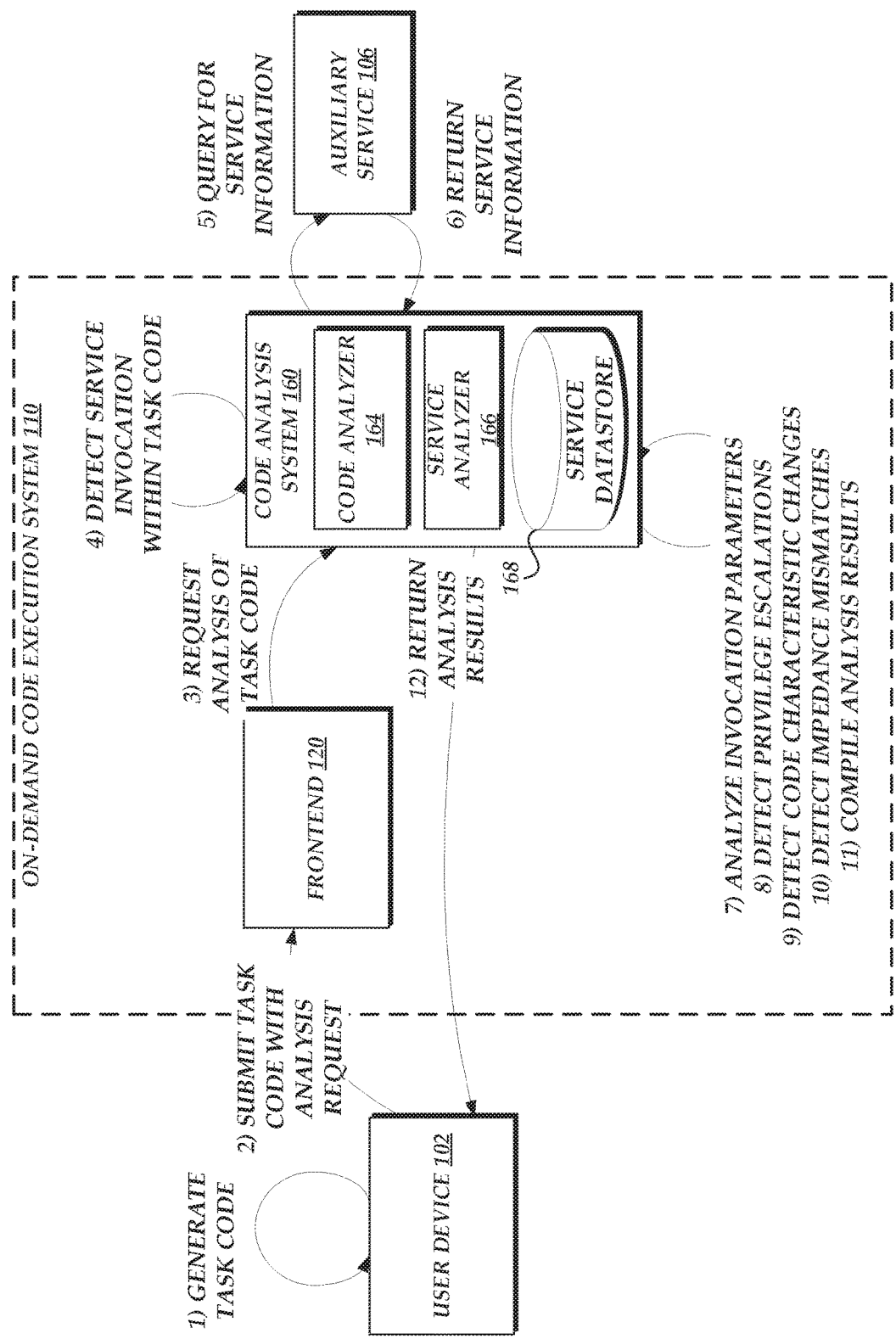
FIG. 3 is a flow diagram depicting illustrative interactions for submitting code corresponding to a task to the on-demand code execution system of FIG. 1, and for the on-demand code execution system to analyze service invocations within the code via static analysis, to identify various potential problems within the code.

With reference to FIG. 3, illustrative interactions are depicted in which the on-demand code execution system 110 conducts static analysis of code of a task submitted to the system 110 by a user device 102. The interactions of FIG. 3 begin at (1), where a user device 102 generates task code for a task on the system 110 (e.g., code intended to be executed by the system 110 to implement desired functionality). For the purposes of illustration of the interactions of FIG. 3, it will be assumed that the code includes at least one service invocation, invoking execution of additional code outside of that submitted by the user device 102. The additional code may correspond, for example, to an auxiliary service 106 or another task on the on-demand code execution system 110.

At (2), the user device 102 submits the task code to the frontend 120, such as by using an API or other interface of the frontend 120. At (3), the frontend 120 transmits a request to the code analysis system 160 to conduct a static analysis of the code, to detect potential issues within the code prior to execution. The code analysis system 110 may then begin to conduct the static analysis of the code. Specifically, at (4), the code analysis system 160 (e.g., using the code analyzer 164) reviews the code to detect a service invocation. In one embodiment, the code analysis system 160 detects a service invocation by recognizing a specific code segment within code of the task, such as a specific function associated with a service or a call to a specific network location (e.g., a uniform resource indicator, or "URI," of the service). Illustratively, the service datastore 168 may be prepopulated with one or more code segments indicating a service invocation of a given service. Thus, the code analysis system 160 may review the code of the task to identify the service invocation. For the purposes of the present description, it will be assumed that the service invocation corresponds to an auxiliary service 160.

At (5), the code analysis system 160 (e.g., via the service analyzer 166) transmits to the invoked auxiliary service 106 a query for service information. The service information may be used, for example, to assist in the static analysis of the code of the task, and may include, for example, expected inputs to the invocation, outputs resulting from the invocation (e.g., as a transformation of the inputs), security parameters of the service, and characteristics of the service. In one embodiment, the query is transmitted to an endpoint (e.g., an API endpoint) of the auxiliary service. At (6), the auxiliary service 106 returns the requested service information. In some instances, service information for the auxiliary service 106 may have been previously generated or retrieved by the code analysis system 160 (e.g., and stored in the service datastore 168). In such instances, interactions (5) and (6) may not be required.

Thereafter, the code analysis system 160 utilizes the service information to statically analyze the code of the task. Specifically, at (7), the code analysis system 160 analyzes invocation parameters to determine whether the parameters are likely to cause errors within the invoked service or any further services (e.g., invoked indirectly by the service invocation). An illustrative routine for analyzing invocation parameters is described below with respect to FIG. 4. Further, at (8), the code analysis system 160 analyzes security information for the directly invoked service and any indirectly invoked services to determine whether code of the task might be vulnerable to privilege escalation (e.g., taking action outside of specific security parameters for the task). An illustrative routine for detecting potential privilege escalation vulnerabilities is described below with respect to FIG. 5. At (9), the code analysis system 160 analyzes service characteristic information for the directly invoked service and any indirectly invoked services to determine whether characteristics of the code of the task might be altered due to the service invocation. For example, the code analysis system 160 may determine that while the code of the task is itself idempotent, the code invokes a non-idempotent service, and thus the service invocation renders the code non-idempotent. An illustrative routine for detecting alterations of code characteristics due to service invocations is described below with respect to FIG. 6. At (10), the code analysis system 160 analyzes service scaling or capacity information for the directly invoked service and any indirectly invoked services to determine whether a potential impedance mismatch exists between the services (e.g., where an invoked service does not have capacity to scale at the rate required by an invoking service). An illustrative routine for detecting potential impedance mismatches to service invocations is described below with respect to FIG. 7.

At (11), the code analysis system 160 compiles results of the above-noted analyses, such as any potentially incorrect invocation parameters, privilege escalation vulnerabilities, changes in code characteristics, or impedance mismatches existing by virtue of a service invocation. These results are then returned to the user device 102 at (12). Thus, a user of the user device 102 can be warned of any potential issues within code of the task, without requiring execution of the code. This analysis can thus provide benefits similar to traditional compilers or interpreters, but unlike such traditional systems, apply analysis across service invocations. Moreover, the analysis can be applied across a call graph (e.g., including both directly and indirectly invoked services), providing a detailed review of issues that might arise during execution of the task.

Figure 4:
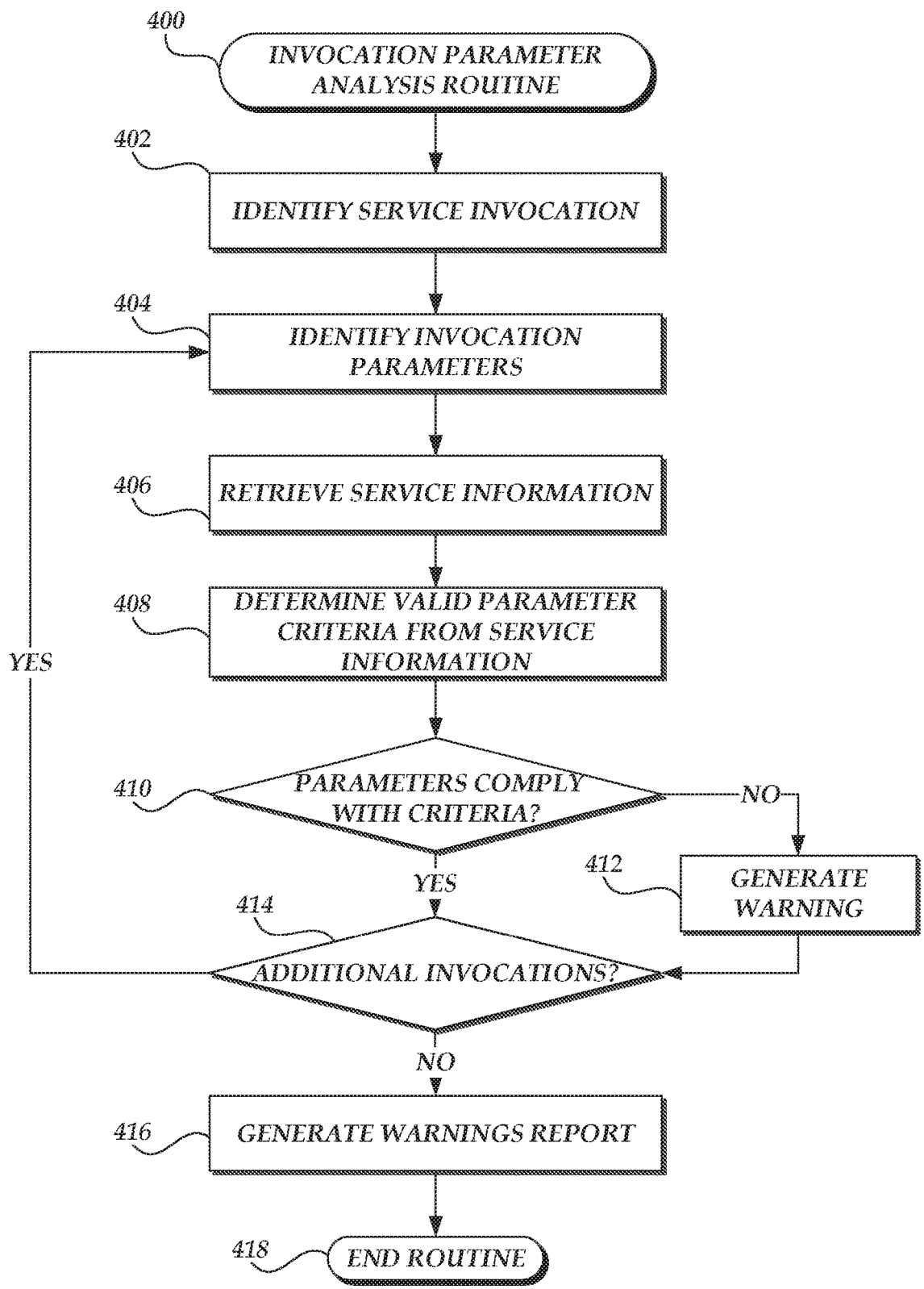
FIG. 4 is a flow chart depicting an illustrative routine for statically analyzing code of a task on the on-demand code execution system of FIG. 1 to identify potentially invalid parameters of a service invocation.
Figure 5:
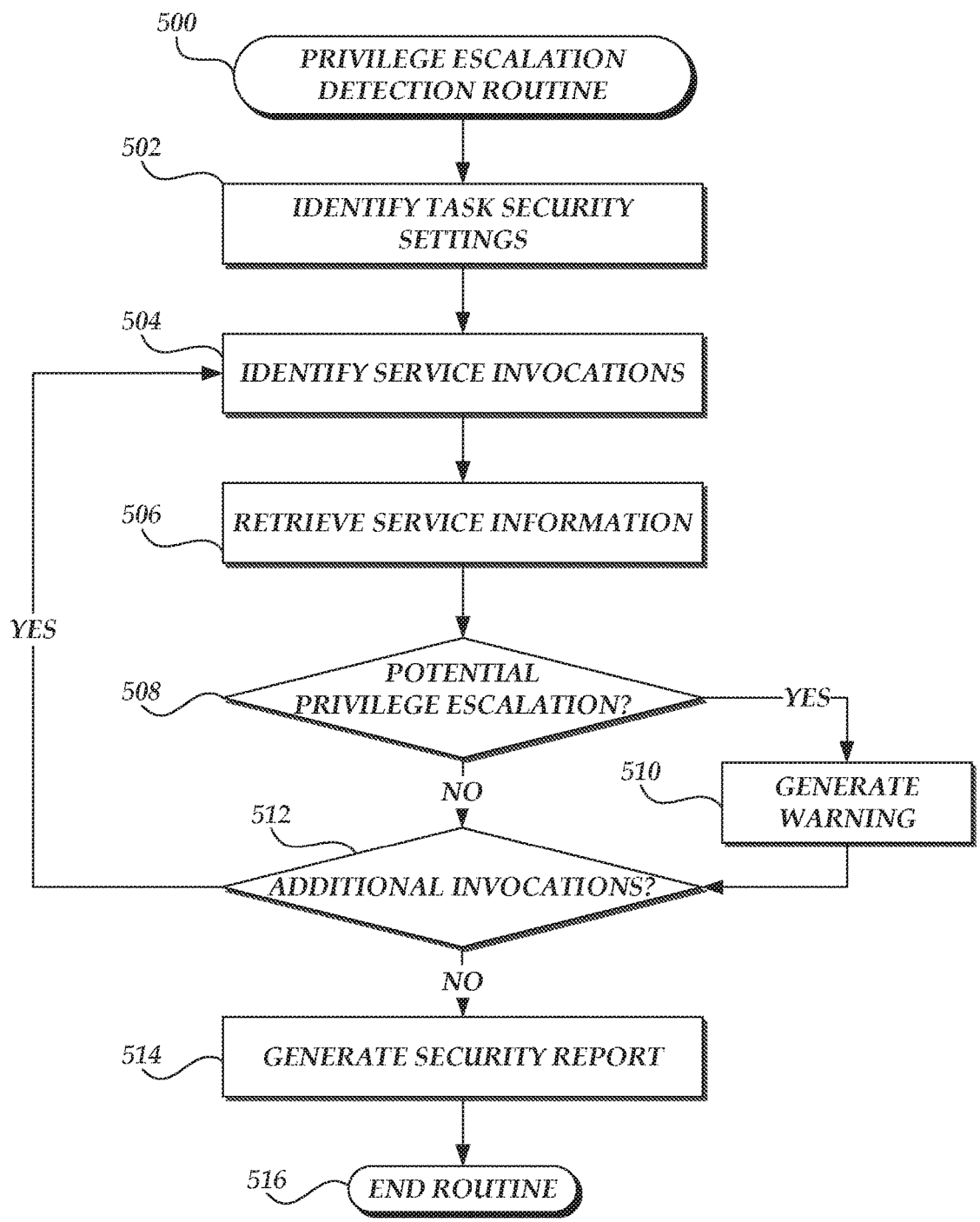
FIG. 5 is a flow chart depicting an illustrative routine for statically analyzing code of a task on the on-demand code execution system of FIG. 1 to identify potential privilege escalation vulnerabilities via service invocations.
Figure 6:
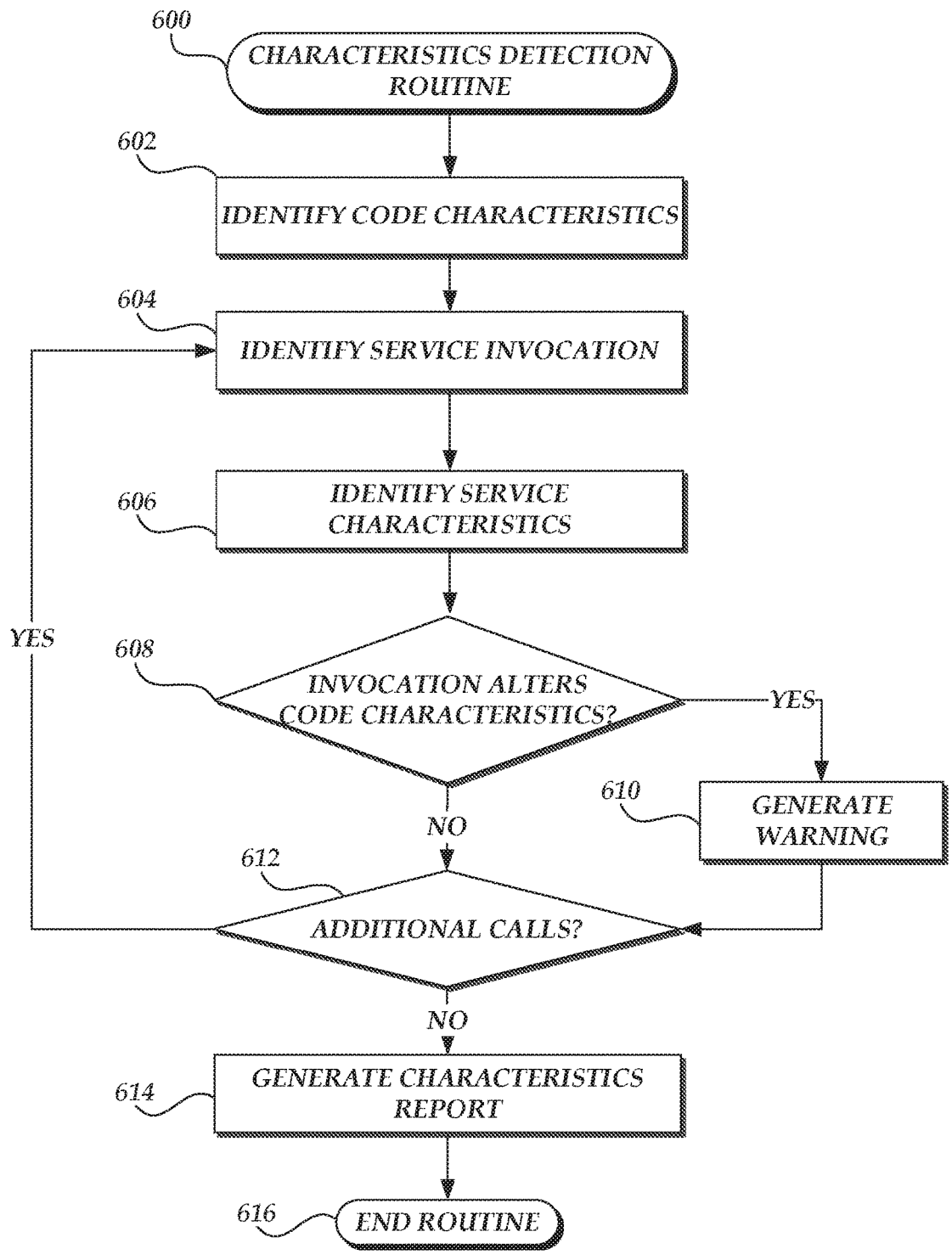
FIG. 6 is a flow chart depicting an illustrative routine for statically analyzing code of a task on the on-demand code execution system of FIG. 1 to identify potential alterations to code characteristics by use of service invocations.
Figure 7:
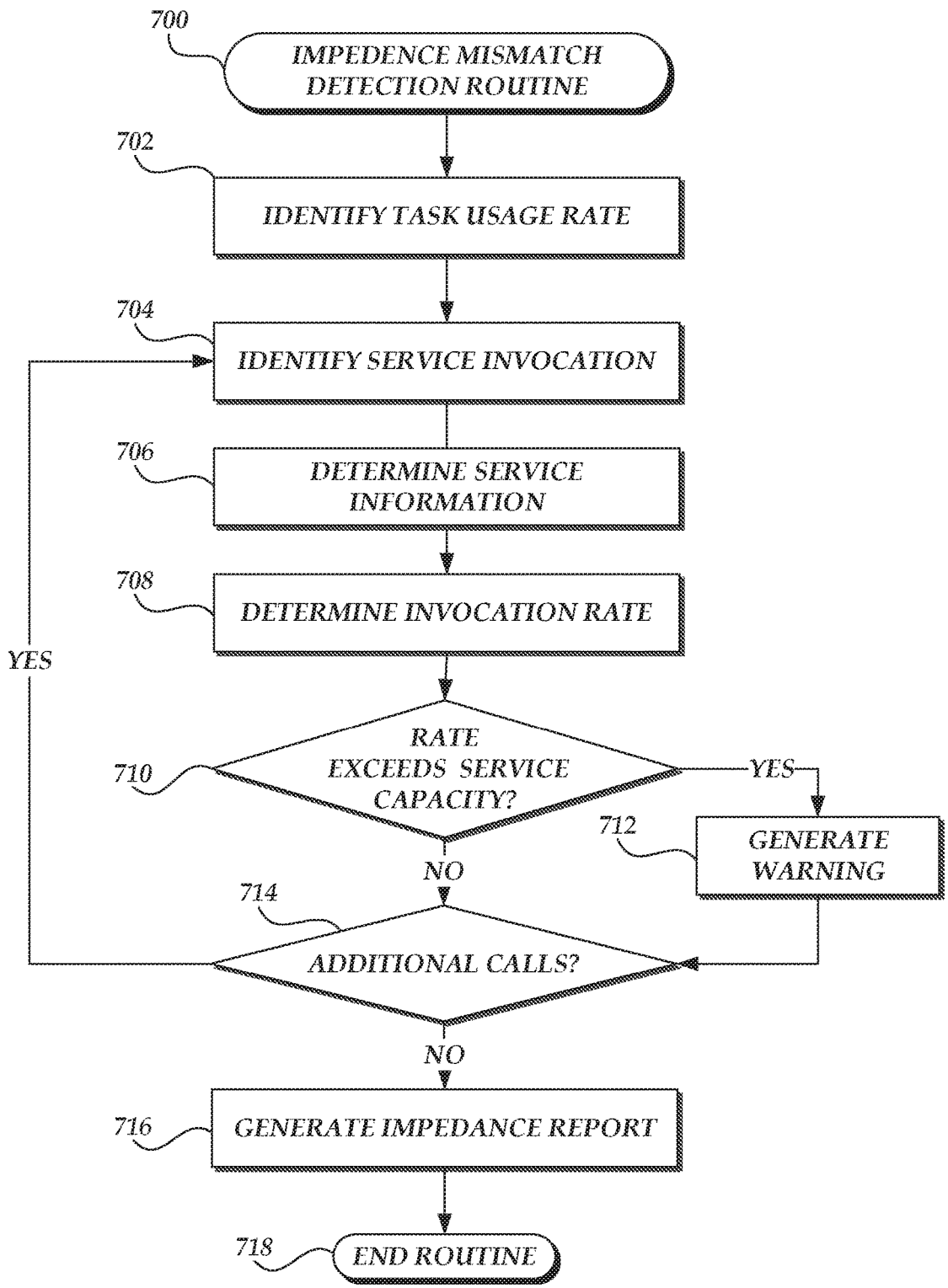
FIG. 7 is a flow chart depicting an illustrative routine for statically analyzing code of a task on the on-demand code execution system of FIG. 1 to identify potential alterations to code characteristics by use of service invocations.

With reference to FIGS. 4-7, illustrative routines are depicted for carrying out the analyses discussed above. Specifically, FIG. 4 depicts an illustrative routine for analyzing invocation parameters within task code to determine potential errors or issues caused by the parameters. FIG. 5 depicts an illustrative routine for detecting potential privilege escalation vulnerabilities caused by a task invocation. FIG. 6 depicts an illustrative routine for detecting alterations of code characteristics due to service invocations within code. FIG. 7 depicts an illustrative routine for detecting potential impedance mismatches due to service invocations. Each of the routines of FIGS. 4-7 may be carried out, for example, by the code analysis system 160 of FIG. 1.

As noted above, FIG. 4 depicts an illustrative routine 400 for analyzing invocation parameters within task code to determine potential errors or issues caused by the parameters. The routine 400 begins at block 402, where a service invocation is identified within the code. Illustratively, the code analysis system 160 may detect a service invocation by identifying a code segment within the code corresponding to the service. For example, each service may be associated with one or more function calls, URIs, or other identifiers that, when detected within code of the task, indicates an invocation of the service. These associations may be stored, for example, in the service information datastore 168 for use by the code analysis system 160.

Thereafter, at block 404, the code analysis system 160 identifies parameters of the service invocation. Illustratively, the code analysis system 160 may determine one or more constant or variable values passed to the service by virtue of the code segment corresponding to the invocation. At block 406, the code analysis system 160 retrieves service information for the invoked service and, at block 408, identifies from the service information criteria for valid parameters to be passed to the service. As noted above, the criteria for valid parameters may be reported directly by the service (e.g., in response to a query by the code analysis system 160) or inferred by the code analysis system 160, such as by conducting machine learning analysis on prior invocations of the service.

At block 410, the code analysis system 160 determines whether the invocation parameters identified at block 404 comply with the criteria identified at block 410. If so, the routine 400 continues to block 414. Otherwise, the routine 400 proceeds to block 412, where a warning is generated to a user indicating non-satisfaction of the criteria by an invocation parameter. The warning may, for example, indicate the specific invocation parameter that is noncompliant, and indicate with which criteria the invocation parameter failed to comply. The routine 400 then also proceeds to block 414.

At block 414, the code analysis system 160 determines whether any additional service invocations are expected to be caused by execution of the code. Additional service invocations can include both direct invocations (e.g., code segments within the code that directly correspond to an invocation of a given service) and indirect invocations, caused by execution of the code but without the code necessarily including a segment directly invoking the service. If a direct invocation is detected, the routine 400 may return to block 402 and proceed as described above, and any warnings for parameters of direct invocations may be compiled at the code analysis system 160.

Unlike direct invocations, it may be difficult or impossible for the code analysis system 160 to identify an indirect invocation expected to be caused by execution of code based solely on the code itself. For example, code may invoke a first service with parameters that cause the first service to invoke a second service (including, e.g., execution of a task on the system 110). While the invocation of the first service may be indicated directly in code of the task, there may be little or no indication within the code of the invocation of the second service. Thus, during implementation of block 414, the code analysis system 160 may be configured to detect any indirect invocations caused by virtue of a prior direct invocation. In one embodiment, the code analysis system 160 may detect indirect invocations based on modeling a predicted output of the code analysis system 160 given invocation parameters (e.g., as detected at block 404). For example, service information for a given service may include an expected output of the service given particular input parameters. Thus, the code analysis system 160 may use the service information for a directly invoked service to determine an expected output of that service (e.g., writing or sending of data to a particular network location). The code analysis system 160 may then determine whether the expected output of the directly invoked service invocation is itself a service invocation. For example, the code analysis system 160 may determine whether the expected output is a call to an API or other service endpoint. As another example, the code analysis system 160 may determine whether the expected output is a trigger for execution of a task (e.g., the task corresponding to code being analyzed or another task) on the system 110), such as writing of information to a specific location on the data storage service 108. If either instance occurs, the code analysis system 160 may detect an indirect service invocation. In another embodiment, indirect service invocations may be detected based on prior knowledge of a call graph of the directly invoked service. For example, in accordance with embodiments of the '434 Patent, a prior tracing of execution of a first directly invoked service may indicate a likelihood that invocation of the first service results in a second service invocation. Thus, during implementation of the routine 400, the analysis system 160 may predict, given a direct invocation of the first service, that an indirect invocation of the second service will also occur.

On detection of an indirect service invocation, the routine 400 may also return to block 404, where blocks 404-414 may continue with respect to the indirectly invoked service. For example, during implementation of block 404, the code analysis system 160 may determine invocation parameters of the indirectly invoked service based on an expected output of the directly invoked service, which may in turn be based on invocation parameters of the directly invoked service as determined by analysis of the code of the task being analyzed during the routine 400. Thus, for example, if the code of the task being analyzed passes a value A to a directly invoked service, which transforms the value A into a value B during invocation of an indirectly invoked service, that value B may be determined to be an input parameter to the indirectly invoked service. Thus, after determining service information for the indirectly invoked service and determining parameter criteria for the indirectly invoked service (e.g., at blocks 406 and 408), the code analysis system 160 can determine, at block 410, whether the value B (in the present example) complies with parameter criteria for the indirectly invoked service. Similar functionalities may be implemented for each service expected to be invoked as part of a "call graph" of the code being analyzed. In some embodiments, the code analysis system 160 may analyze parameters for all invoked services within the call graph. In other embodiments, the code analysis system 160 may analyze parameters for less than all services invoked within a call graph, such as by analyzing parameters of the first n services (where n may be set, for example, by an administrator of the system 110) or by implementing anti-loop techniques to halt parameter analysis for the nth invocation of a given service. Thus, potential errors may be detected for indirectly invoked services, even where parameters passed to the directly invoked service or valid.

As a concrete example of detection of errors in parameters for indirectly invoked services, consider an instance in which a storage service is directly invoked in code of a task, and parameters are passed to the storage service to store a value at a given location (e.g., a specific URI). Consider that a second task may exist on the system 110 that, when new data is written to the given location, cause the system 110 to execute code of the second task to process the new data. When the code of the second task expects the new data to be formatted according to a given specification (e.g., as a number), but the value written by the code of the initially analyzed task is outside of that specification (e.g., as an alphanumeric), execution of the code of the initially analyzed task is likely to result in errors, despite the fact that the value written by that code may be a parameter compliant with the storage service. By analyzing parameters of both direct and indirect service invocations in the manner described above, embodiments of the present application can detect such errors that may otherwise become apparent only after execution of the task.

When no additional invocations (either direct or indirect) are detected for analysis, the routine 400 can proceed to block 416, where a warnings report can be generated indicating any warnings generated during implementations of block 412. This warnings report may then be transmitted to a user, such that code of an analyzed task may be corrected to reduce errors during execution of the task. The routine 400 can then end at block 418.

As noted above, FIG. 5 depicts an illustrative routine 500 for analyzing service invocations within task code to determine potential privilege escalation vulnerabilities. The routine 500 begins at block 502, where security settings for the task are retrieved. The security settings may be specified, for example, by a user submitting the task, and may specify one or more services that the task is permitted to invoke, as well as criteria for allowed parameters of such services (e.g., locations to pass as parameters for such services). Thereafter, at block 504, a service invocation is identified within the code. Illustratively, the code analysis system 160 may detect a service invocation by identifying a code segment within the code corresponding to the service. For example, each service may be associated with one or more function calls, URIs, or other identifiers that, when detected within code of the task, indicates an invocation of the service. These associations may be stored, for example, in the service information datastore 168 for use by the code analysis system 160.

At block 506, the code analysis system 160 identifies service information for the service identified as invoked. As noted above, the service information can include, for example, expected inputs and outputs of the service as well as security information of the service. Thereafter, at block 508, the code analysis system 160 determines from the service information whether a potential privilege escalation exists with respect to the task being analyzed, by virtue of the detected service invocation. In this context, a privilege escalation can generally refer to the ability of the code of the task, when being executed, to undertake actions not allowed under security settings of the task. Illustratively, where security settings for a task specify only a specific set of services that may be invoked during execution of the task, but an invocation is detected to a service outside the specific set, the code analysis system 160 may detect a potential privilege escalation. As another illustration, where security settings for a task indicate specific locations within a data storage service to which an execution of the task can write data, but an invocation is detected that writes data outside of the specific locations, the code analysis system 160 may detect a potential privilege escalation. In some instances, the code analysis system 160 identify as a potential privilege escalation any invocation of a service not allowed under the task's security settings (e.g., invoking a completely barred service, invoking an otherwise allowed service with unallowed parameters, etc.). In other instances, the code analysis system 160 may detect as a potential privilege escalation only unallowed invocations that also pass, as part of that invocation, variable data passed as a parameter to the task execution. This configuration may, for example, detect potential privilege escalations due to malformed parameters being passed to the task execution while not flagging as potential privilege escalations functionalities such as logging undertaken by invoked services.

On detection of a potential privilege escalation, the routine 500 proceeds to block 510, where a warning is generated to a user indicating the potential privilege escalation. The warning may, for example, indicate the specific security setting potential escapable by an execution of the task, and a specific invocation associated with the potential privilege escalation. The routine 500 then also proceeds to block 512.

At block 512, the code analysis system 160 determines whether any additional service invocations are expected to be caused by execution of the code. As noted above, additional service invocations can include both direct invocations (e.g., code segments within the code that directly correspond to an invocation of a given service) and indirect invocations, caused by execution of the code but without the code necessarily including a segment directly invoking the service. Determination of additional service invocations can be detected as discussed above with respect to FIG. 4. For each direct and indirect invocation, the routine 500 may return to block 504, iterating through blocks 504-510, as discussed above. As discussed with reference to FIG. 4, parameters passed to each indirect invocation may be modeled based on service information for the invoked services. As such, potential privilege escalations may be detected even in the presence of complex call structures. For example, consider an instance in which code of a task calls a first service, passing a variable parameter (e.g., specified by calling parameters for the task during a task execution) to the first service. Where security parameters for the task enable the first service to be called with a variable parameter, the code analysis system 160 may initially detect no potential privilege escalation. However, where the first service invokes a second service not allowed under the task's security parameters, a privilege escalation vulnerability may exist. Thus, by comparing a task's security parameters to both direct and indirect service invocations, the code analysis system 160 may detect vulnerabilities missed by other techniques.

In some embodiments, potential privilege escalation vulnerability detection may be based on additional or alternative factors, such as use of (or passing of information to) one of a set of functions known to cause privilege escalation vulnerabilities. For example, calling of an "exec" function (e.g., which executes a command within an operating system shell) within a directly or indirectly invoked service, or passing variable information to that function, may cause the code analysis system 160 to detect a potential privilege escalation vulnerability.

When no additional invocations (either direct or indirect) are detected for analysis, the routine 500 can proceed to block 514, where a security report can be generated indicating any potential privilege escalation warnings generated during implementations of block 510. This security report may then be transmitted to a user, such that code of an analyzed task may be corrected to reduce errors during execution of the task. The routine 500 can then end at block 516.

While the routine 500 is described above with respect to detection of privilege escalation vulnerabilities, the routine 500 may in some embodiments be modified to detect other potential security issues. For example, in one embodiment, in addition to or alternatively to detecting potential privilege escalation vulnerabilities, the code analysis system 160 may inspect security parameters of both a calling service and an invoked service to ensure correct permissions exist for the calling service to invoke the invoked service. For example, where a task on the system 110 calls a first service directly, the code analysis system 160 may confirm that the security parameters of a task on the system 110 allow for calling the first service, and that the security parameters of the first service allow for invocation of that service from the task. The code analysis system 160 may complete this inspection for each directly and indirectly invoked service to ensure that permissions errors are unlikely to occur on executing the task. Thus, the code analysis system 160 is enabled to conduct a variety of validations with respect to security issues that may arise during execution of code of a task.

In some embodiments, the security report, in addition to noting detected security issues, may be generated by the code analysis system 160 to include suggested modifications to a task's security settings. For example, where a privilege escalation vulnerability is detected based on a task's security settings being more restrictive than security settings of an invoked service, the code analysis system 160 may generate a security report that suggests expanding the task's security settings to include those privileges of each invoked service (e.g., directly or indirectly invoked). This suggestion may be included, for example, as an interface element selectable by a user viewing the security report. The code analysis system 160 may further be configured to respond to selection of the interface element by modifying the task's security settings to conform to the suggested settings (e.g., by expanding the task's security settings to include actions taken by directly or indirectly invoked services). Thus, in addition to warning users of security issues, the code analysis system 160 may generate security reports that enable users to correct such issues.

FIG. 6 depicts an illustrative routine for detecting alterations of code characteristics due to service invocations within code. As will be appreciated by one skilled in the art, a variety of characteristics may be desirable within code intended for execution as a network-based service. These characteristics can include code properties, such as idempotency (generally described, the property that the code, if run multiple times with the same input, does not alter its result), as well as conformity to a variety of standards (e.g., as a representational state transfer, or "REST," service). While techniques are known in the art to evaluate an individual set code for a given characteristic, these techniques do not apply across services. In the context of modular network services, these techniques are therefore inadequate to ensure that a code will in practice display a given characteristic. For example, code itself may appear idempotent to conventional techniques but invoke a non-idempotent service (or a service in a manner that renders the service non-idempotent). Thus, the code may be non-idempotent in practice. Similarly, code itself may appear to conform to a given standard but invoke a service that does not conform to that standard. To address these deficiencies, embodiments of the present application enable the system 110 (e.g., via the code analysis system 160) to verify code characteristics through a call graph of code, notifying a user when code directly or indirectly invokes a service that would alter a desirable characteristic of the code. The routine 600 of FIG. 6 is illustrative of how the system 110 may detect these alterations.

The routine 600 begins at block 602, where code characteristics for the code of the task are identified, based on the code itself. A variety of techniques are known in the art to verify various code characteristics, such as idempotency or conformance with a given standard. In one embodiment, a user submitting code of a task may specify one or more rules for use by the code analysis system 160 in determining code characteristics based on code. In another embodiment, a user submitting code of a task may also submit separate code (e.g., as a separate task on the system 110) configured to analyze given code to determine code characteristics of the given code.

At block 604, a service invocation is identified within the code. Illustratively, the code analysis system 160 may detect a service invocation by identifying a code segment within the code corresponding to the service. For example, each service may be associated with one or more function calls, URIs, or other identifiers that, when detected within code of the task, indicates an invocation of the service. These associations may be stored, for example, in the service information datastore 168 for use by the code analysis system 160.

At block 606, the code analysis system 160 identifies service information for the service identified as invoked. As noted above, the service information can include, for example, expected inputs and outputs of the service as well as characteristic information of the service. Thereafter, at block 608, the code analysis system 160 determines from the service information whether invocation of the service from the task will alter the characteristics of the task (e.g., as determined at block 602). In one embodiment, characteristics of service invocations may be static, such that a given service does or does not have a given characteristic. For example, service information for a service may indicate that the service is idempotent, or complies with a given standard (e.g., the REST architecture). Thus, if the service is indicated within service information as having a given characteristic, implementation of block 608 may include comparing the characteristic of the service to the characteristics of the task to determine whether a difference exists between the two. In another embodiment, characteristics of service invocations may vary during execution of code, such that whether a service does or does not have a given characteristic may depend on factors such as parameters to be passed to the service. Accordingly, implementation of block 608 may include determining expected input parameters to the service, based on invocation of that service from the code of the task, and comparing characteristics of the service based on invocation given the expected input parameters with the characteristics of the task code.

If at block 608 no difference in characteristics is determined between the characteristics of the task code and the characteristics of the invoked service, the routine 600 proceeds to block 612 as discussed below. If at block 608 a difference in characteristics is determined between the characteristics of the task code and the characteristics of the invoked service, the routine 600 proceeds to block 610, where a warning is generated to a user indicating the expected alteration of code characteristics based on the service invocation. The warning may, for example, indicate the specific alteration in code characteristics expected to be caused, as well as the service invocation expected to cause the change. The routine 600 then also proceeds to block 612.

At block 612, the code analysis system 160 determines whether any additional service invocations are expected to be caused by execution of the code. As noted above, additional service invocations can include both direct invocations (e.g., code segments within the code that directly correspond to an invocation of a given service) and indirect invocations, caused by execution of the code but without the code necessarily including a segment directly invoking the service. Determination of additional service invocations can be detected as discussed above with respect to FIG. 4. For each direct and indirect invocation, the routine 600 may return to block 604, iterating through blocks 604-612, as discussed above. As discussed with reference to FIG. 4, parameters passed to each indirect invocation may be modeled based on service information for the invoked services. As such, by comparing a task's code characteristics parameters to characteristics of both direct and indirect service invocations, the code analysis system 160 may detect changes in characteristics that would be missed by other techniques.

When no additional invocations (either direct or indirect) are detected for analysis, the routine 600 can proceed to block 614, where a characteristics report can be generated indicating any warnings for potential changes in code characteristics generated during implementations of block 610. This characteristics report may then be transmitted to a user, such that code of an analyzed task may be corrected to reduce errors during execution of the task. The routine 600 can then end at block 616.

FIG. 7 depicts an illustrative routine for detecting impedance mismatches between a task and services invoked by the task, or between services invoked by the task. Generally described, impedance mismatches in the context of the present disclosure reflect a difference in an expected utilization rate of a service and the ability of the service to perform at that utilization rate. For example, an impedance mismatch may occur when a task is expected to invoke (directly or indirectly) a service at a rate of 100 invocations per second, but the service has capacity to be invoked only 90 times per son. As another example, an impedance mismatch might occur when data is transmitted to an invoked service at a rate of 100 megabits per second (mbps) but the invoked service has capacity to handle only 10 mbps of data. Occurrence of an impedance mismatch can cause significant errors to occur during execution. As such, it can be desirable to identify such mismatches prior to execution of a task. Moreover, even when impedance mismatches do not exist, it may be desirable to inform a user as to the expected potential utilization rate of a task. For example, a user may be informed as to the maximum capacity of invoked services given current invocation parameters, such that a throttling rate for the task may be established to avoid errors occurring during execution. The routine 700 of FIG. 7 is illustrative of how the system 110 may detect impedance mismatches for a task.

The routine 700 begins at block 702, where an expected task utilization rate is identified. The task utilization rate may be based, for example, on a current maximum usage rate specific by a user associated with the task, or on an expected utilization rate as specified by the user. As another example, the task utilization rate may be predicted based on historical information, such as a based frequency of execution of the task on the system 110 or a past frequency with which triggering criteria for the task would have been satisfied (e.g., if that criteria were established during the past period of time).

At block 704, a service invocation is identified within the code. Illustratively, the code analysis system 160 may detect a service invocation by identifying a code segment within the code corresponding to the service. For example, each service may be associated with one or more function calls, URIs, or other identifiers that, when detected within code of the task, indicates an invocation of the service. These associations may be stored, for example, in the service information datastore 168 for use by the code analysis system 160.

At block 706, the code analysis system 160 determines service information for the service identified as invoked. As noted above, the service information can include, for example, expected inputs and outputs of the service as well as capacity information of the service. Thereafter, at block 708, the code analysis system 160 determines from the service information an expected invocation rate for the service. The expected invocation rate may be based, for example, on a number of calls to invoke the service within code of the task, as well as an arrangement of those calls within the code (e.g., as being included within a loop of n length). In some embodiments, the code analysis system 160 may be configured to assume that execution of code of the task will complete very quickly or instantaneous, such that if code of a task includes n invocations of a service, and the task is expected to execution m times per second, then n*m invocations of the service are expected to occur. In other embodiments, the code analysis system may be configured to estimate timing of invocations to services based on analysis of the code of the task, such as based on a number of lines of code separating different invocations or recognition of specific functions within the code that may alter timing (e.g., calls to a "pause" function). In some embodiments, the expected invocation rate may further be based on an amount of data transmitted as part of a service invocation. Illustratively, the data amount may be based on a parameter type of the data passed, such as by assuming a maximum length of data for a given parameter type.

At block 710, the code analysis system 160 determines whether the expected invocation rate for the invoked service exceeds the capacity of the service (e.g., as reflected in the service information for the service). If at block 710 the expected invocation rate for the invoked service does not exceed the capacity of the service, the routine 700 proceeds to block 614 as discussed below. If at block 710 the expected invocation rate for the invoked service does exceed the capacity of the service, the routine 700 proceeds to block 710, where a warning is generated to a user indicating the expected exceeding of capacity for the invoked service. The warning may, for example, indicate the specific service whose capacity is expected to be exceeded, as well as the service invocations expected to cause the issue. The routine 700 then also proceeds to block 712.

At block 712, the code analysis system 160 determines whether any additional service invocations are expected to be caused by execution of the code. As noted above, additional service invocations can include both direct invocations (e.g., code segments within the code that directly correspond to an invocation of a given service) and indirect invocations, caused by execution of the code but without the code necessarily including a segment directly invoking the service. Determination of additional service invocations can be detected as discussed above with respect to FIG. 4. For each direct and indirect invocation, the routine 700 may return to block 704, iterating through blocks 704-714, as discussed above. More specifically, for each indirectly invoked service, the expected invocation rate of the service may be based on the "chain" of calls between the indirectly invoked service and the task whose code is being analyzed. For example, where a task is expected to be executed at a rate of x calls per second, and includes y calls to a second task, which in turn includes z calls to a given service, the expected invocation rate of the given service may be calculated as x*y*z. By combining information as to the expected task usage rate with the expected invocation rate for each service within a chain of calls between the task and a given indirectly invoked service, a total expected invocation rate for the indirectly invoked service can be calculated and compared to a service capacity for the indirectly invoked service. Such a comparison can enable the code analysis system 160 to detect impedance mismatches even for indirectly invoked services, that may not be immediately apparent based on the code of a task alone.

When no additional invocations (either direct or indirect) are detected for analysis, the routine 700 can proceed to block 716, where an impedance report can be generated indicating any warnings for potentially exceeding the service capacity of invoked services. In some instances, the impedance report may further indicate suggested modifications to a task usage rate, based on the expected utilization rates of directly or indirectly invoked services. For example, the impedance report may indicate a maximum task usage rate that may be set by the user such that no directly or indirectly invoked service would exceed invocation capacity. This information may be included, for example, as an interface element selectable by a user viewing the impedance report. The code analysis system 160 may further be configured to respond to selection of the interface element by modifying the task's settings to conform to the suggested settings (e.g., by setting a throttle for the task equal to or less than the maximum task usage rate that may be set such that no directly or indirectly invoked service would exceed invocation capacity expanding the task's security settings). Thus, in addition to warning users of impedance mismatches, the code analysis system 160 may generate impedance reports that enable users to correct such issues. This impedance report may then be transmitted to a user, such that code of an analyzed task may be corrected to reduce errors during execution of the task. The routine 700 can then end at block 718.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
    obtaining executable code from a user device;
    determining characteristic information for the executable code, the characteristic information indicating a desired characteristic of the executable code;
    identifying a code portion within the executable code invoking a first network-accessible service;
    determining that an expected output of the first network-accessible service corresponds to an expected invocation of one or more second network-accessible services;
    obtaining characteristic information for the one or more second network-accessible services;
    determining, from at least the characteristic information for the one or more second network-accessible services, that the expected invocation of the one or more second network-accessible services is associated with an execution of the executable code not having the desired characteristic; and
    transmitting an indication that the expected invocation of the one or more second network-accessible services is associated with an execution of the executable code not having the desired characteristic,
    wherein the method is implemented independent of execution of the executable code.

2. The computer-implemented method of claim 1, wherein the one or more second network-accessible services are not referenced within the executable code.

3. The computer-implemented method of claim 1, wherein identifying the invocation within the executable code further comprises referencing information mapping the code portion to the first network-accessible service.

4. The computer-implemented method of claim 1, wherein determining that the expected output of the first network-accessible service corresponds to the expected invocation of one or more second network-accessible services comprises determining that the expected output of the first network-accessible service is the expected invocation of the one or more second network-accessible services.

5. The computer-implemented method of claim 1, wherein at least one of the one or more second network-accessible services is implemented as an execution of second executable code on an on-demand code execution system, and wherein determining that the expected output of the first network-accessible service corresponds to the expected invocation of the one or more second network-accessible services comprises determining that the expected output of the first network-accessible service satisfies criteria maintained at the on-demand code execution system for execution of the second executable code.

6. The computer-implemented method of claim 1 further comprising:
    obtaining characteristic information for the first network-accessible service;
    determining, from at least the characteristic information for the first network-accessible service, that the expected invocation of the first network-accessible service is associated with an execution of the executable code not having the desired characteristic; and
    transmitting an indication that the expected invocation of the first network-accessible service is associated with an execution of the executable code not having the desired characteristic.

7. A system to analyze code executable on an on-demand code execution system to detect alterations in code characteristics caused by invocation of a network-accessible service, the system comprising:
    a physical data store storing executable code submitted to the on-demand code execution system by a user device, the executable code including a code portion invoking a first network-accessible service; and
    a computing device in communication with the physical data store and configured, independent of execution of the executable code, to:
        determine characteristic information for the executable code, the characteristic information indicating a desired characteristic of the executable code;
        identify the code portion within the executable code invoking the first network-accessible service;
        determine an expected output of the first network-accessible service, the expected output including an expected invocation of one or more second network-accessible services not referenced within the executable code;
        obtain characteristic information for the one or more second network-accessible services;
        determine, from at least the characteristic information for the one or more second network-accessible services, that the expected invocation of the one or more second network-accessible services is associated with an execution of the executable code not having the desired characteristic; and
        transmit an indication that the expected invocation of the one or more second network-accessible services is associated with an execution of the executable code not having the desired characteristic.

8. The system of claim 7, wherein the desired characteristic of the executable code is at least one of a property of the code or conformance with a standard.

9. The system of claim 8, wherein the property of the code is idempotency.

10. The system of claim 7, wherein the computing device is configured to determine that the executable code, analyzed independently of the first or second network-accessible services, has the desired characteristic.

11. The system of claim 7, wherein the computing device is configured to determine that the executable code has the desired characteristic based at least partly on processing the executable code through second executable code specified by the user device.

12. The system of claim 7, wherein the indication includes an identification of the invocation of the first network-accessible service within the executable code and an indication that the invocation of the first network-accessible service is expected to cause the invocation of the one or more second network-accessible services.

13. Non-transitory computer-readable media comprising executable instructions that, when executed on a computing system, cause the computing system to:
    obtain executable code from a user device; and
    independent of execution of the executable code:
        determine characteristic information for the executable code, the characteristic information indicating a desired characteristic of the executable code;

identify a code portion within the executable code invoking a first network-accessible service;

determine that an expected output of the first network-accessible service corresponds to an expected invocation of one or more second network-accessible services;

obtain characteristic information for the one or more second network-accessible services;

determine, from at least the characteristic information for the one or more second network-accessible services, that the expected invocation of the one or more second network-accessible services is associated with an execution of the executable code not having the desired characteristic; and transmit an indication that the expected invocation of the one or more second network-accessible services is associated with an execution of the executable code not having the desired characteristic.

14. The non-transitory computer-readable media of claim 13, wherein the characteristic information for the one or more second network-accessible services comprises criteria for determining whether the invocation of the one or more second network-accessible services is associated with the execution of the executable code not having the desired characteristic based at least partly on a parameter passed within the invocation of the one or more second network-accessible services.

15. The non-transitory computer-readable media of claim 14, wherein the expected output of the first-network accessible service indicates an expected parameter to be passed to the one or more second network-accessible services, and wherein the executable instructions further cause the computing system to determine that the expected invocation of the one or more second network-accessible services is associated with the execution of the executable code not having the desired characteristic at least partly by applying the criteria for determining whether the expected invocation of the one or more second network-accessible services is associated with the execution of the executable code not having is associated with the desired characteristic to the expected parameter.

16. The non-transitory computer-readable media of claim 15, wherein the executable instructions further cause the computing system to:

obtain service information for the first network-accessible service, the service information including a transformation of an input parameter to an output of the first network-accessible service; and determine the expected parameter to be passed to the one or more second network-accessible services based at least partly on applying the transformation to a parameter to be passed to the first network-accessible service by the executable code.

17. The non-transitory computer-readable media of claim 16, wherein the executable instructions further cause the computing system to:

determine the transformation based on a record of one or more prior input parameters to the first network-accessible service and one or more prior outputs of the first network-accessible service corresponding to the one or more prior input parameters.

18. The non-transitory computer-readable media of claim 16, wherein the service information is obtained at the computing system in response to transmission of a query to an application programming interface of the first network-accessible service.

19. The non-transitory computer-readable media of claim 13, wherein the indication includes an identification of the expected invocation of the first network-accessible service within the executable code and an indication that the expected invocation of the first network-accessible service is expected to cause the expected invocation of the one or more second network-accessible services.

\* \* \* \* \*